(12) United States Patent
Vasheghani Farahani et al.

(10) Patent No.: US 11,748,597 B1
(45) Date of Patent: Sep. 5, 2023

(54) COMPUTERIZED ENGINES AND GRAPHICAL USER INTERFACES FOR CUSTOMIZING AND VALIDATING FORECASTING MODELS

(71) Applicant: SAS Institute Inc., Cary, NC (US)

(72) Inventors: Iman Vasheghani Farahani, Charlotte, NC (US); Ron Travis Hodgin, Roxboro, NC (US); Sujatha Pothireddy, Apex, NC (US); Kaushal Lalitkumar Chauhan, Pune (IN); Bhupendra Suresh Bendale, Pune (IN); Harshad Dinesh Bapat, Manharashtra (IN); Kritika Misra, Manharashtra (IN)

(73) Assignee: SAS Institute, Inc., Cary, NC (US)

( * ) Notice: Subject to any disclaimer, the term of this patent is extended or adjusted under 35 U.S.C. 154(b) by 0 days.

(21) Appl. No.: 18/114,852

(22) Filed: Feb. 27, 2023

Related U.S. Application Data

(60) Provisional application No. 63/390,221, filed on Jul. 18, 2022, provisional application No. 63/321,101, filed on Mar. 17, 2022.

(51) Int. Cl.
  *G06N 3/04* (2023.01)
  *G06N 3/044* (2023.01)
  *G06F 3/04847* (2022.01)

(52) U.S. Cl.
  CPC ......... *G06N 3/044* (2023.01); *G06F 3/04847* (2013.01)

(58) Field of Classification Search
  None
  See application file for complete search history.

(56) References Cited

U.S. PATENT DOCUMENTS 10,860,950 B2 * 12/2020 Chu ................. G06N 20/00
2022/0292085 A1 * 9/2022 Shahriar ............ G06F 16/243

FOREIGN PATENT DOCUMENTS

CN         110457476 A  * 11/2019  ............ G06F 16/35

* cited by examiner

*Primary Examiner* — Li Wu Chang
(74) *Attorney, Agent, or Firm* — Kilpatrick Townsend & Stockton LLP

(57) ABSTRACT

Some examples can involve a system that can receive a first user selection of time series data and a second user selection of a type of forecasting model to apply to the time series data. The system can then obtain a first set of candidate values and a second set of candidate values for a first parameter and a second parameter, respectively, of the selected type of forecasting model. The candidate values may be determined based on statistical information derived from the time series data. The system can then provide the first set of candidate values and the second set of candidate values to the user, receive user selections of a first parameter value and a second parameter value, and determine whether a conflict exists between the first parameter value and the second parameter value. If so, the system can generate an output indicating that the conflict exists.

30 Claims, 38 Drawing Sheets

COMPUTERIZED ENGINES AND GRAPHICAL USER INTERFACES FOR CUSTOMIZING AND VALIDATING FORECASTING MODELS

REFERENCE TO RELATED APPLICATIONS

This claims the benefit of priority under 35 U.S.C. § 119(e) to U.S. Provisional Patent Application No. 63/390,221, filed Jul. 18, 2022, and U.S. Provisional Patent Application No. 63/321,101, filed Mar. 17, 2022, the entirety of each of which is hereby incorporated by reference herein.

TECHNICAL FIELD

The present disclosure relates generally to computer software for generating custom forecasting models. More specifically, but not by way of limitation, this disclosure relates to computerized engines and graphical user interfaces for customizing and validating forecasting models.

BACKGROUND

Forecasting software can allow a user to apply a premade forecasting model to a time series dataset to produce a predicted forecast. Examples of such forecasting models can include an exponential smoothing model (ESM), an autoregressive (AR) model, a moving average (MA) model, an autoregressive integrated moving average (ARIMA) model, a vector autoregressive (VAR) model, a neural network, etc. The predicted forecast can be a forecast of predicted values over a future time window.

SUMMARY

One example of the present disclosure can include a system. The system may comprise one or more processors. The system may also comprise one or more memory devices including program code that is executable by the one or more processors for causing the one or more processors to perform operations. The operations can include receiving, from a user, a first selection of time series data to be used in a forecasting project. The operations can include receiving, from the user, a second selection of a type of forecasting model that is to be applied to the time series data in the forecasting project from among a plurality of types of forecasting models. The operations can include, based on receiving the first selection and the second selection: obtaining a first set of candidate values for a first parameter of the selected type of forecasting model, the first set of candidate values being determined based on statistical information derived from the time series data; obtaining a second set of candidate values for a second parameter of the selected type of forecasting model, the second set of candidate values being determined based on the statistical information; and providing the first set of candidate values and the second set of candidate values for output to the user. The operations can include receiving, from the user, selections of a first parameter value from among the first set of candidate values and a second parameter value from among the second set of candidate values. The operations can include subsequent to receiving the selections, determining that a conflict exists between the first parameter value and the second parameter value that would cause an operational problem with the selected type of forecasting model, the conflict being determined by applying a set of conflict rules to the first parameter value and the second parameter value. The operations can include, based on determining that the conflict exists, generating an output indicating that the conflict exists between the first parameter value and the second parameter value.

Another example of the present disclosure can include a method comprising operations that may be performed by one or more processors. The operations can include receiving, from a user, a first selection of time series data to be used in a forecasting project. The operations can include receiving, from the user, a second selection of a type of forecasting model that is to be applied to the time series data in the forecasting project from among a plurality of types of forecasting models. The operations can include, based on receiving the first selection and the second selection: obtaining a first set of candidate values for a first parameter of the selected type of forecasting model, the first set of candidate values being determined based on statistical information derived from the time series data; obtaining a second set of candidate values for a second parameter of the selected type of forecasting model, the second set of candidate values being determined based on the statistical information; and providing the first set of candidate values and the second set of candidate values for output to the user. The operations can include receiving, from the user, selections of a first parameter value from among the first set of candidate values and a second parameter value from among the second set of candidate values. The operations can include subsequent to receiving the selections, determining that a conflict exists between the first parameter value and the second parameter value that would cause an operational problem with the selected type of forecasting model, the conflict being determined by applying a set of conflict rules to the first parameter value and the second parameter value. The operations can include, based on determining that the conflict exists, generating an output indicating that the conflict exists between the first parameter value and the second parameter value.

Yet another example of the present disclosure includes a non-transitory computer-readable medium comprising program code that is executable by one or more processors for causing the one or more processors to perform operations. The operations can include receiving, from a user, a first selection of time series data to be used in a forecasting project. The operations can include receiving, from the user, a second selection of a type of forecasting model that is to be applied to the time series data in the forecasting project from among a plurality of types of forecasting models. The operations can include, based on receiving the first selection and the second selection: obtaining a first set of candidate values for a first parameter of the selected type of forecasting model, the first set of candidate values being determined based on statistical information derived from the time series data; obtaining a second set of candidate values for a second parameter of the selected type of forecasting model, the second set of candidate values being determined based on the statistical information; and providing the first set of candidate values and the second set of candidate values for output to the user. The operations can include receiving, from the user, selections of a first parameter value from among the first set of candidate values and a second parameter value from among the second set of candidate values. The operations can include subsequent to receiving the selections, determining that a conflict exists between the first parameter value and the second parameter value that would cause an operational problem with the selected type of forecasting model, the conflict being determined by applying a set of conflict rules to the first parameter value and the second parameter value. The operations can include, based on determining that the conflict exists, generating an output indicating that the conflict exists between the first parameter value and the second parameter value.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
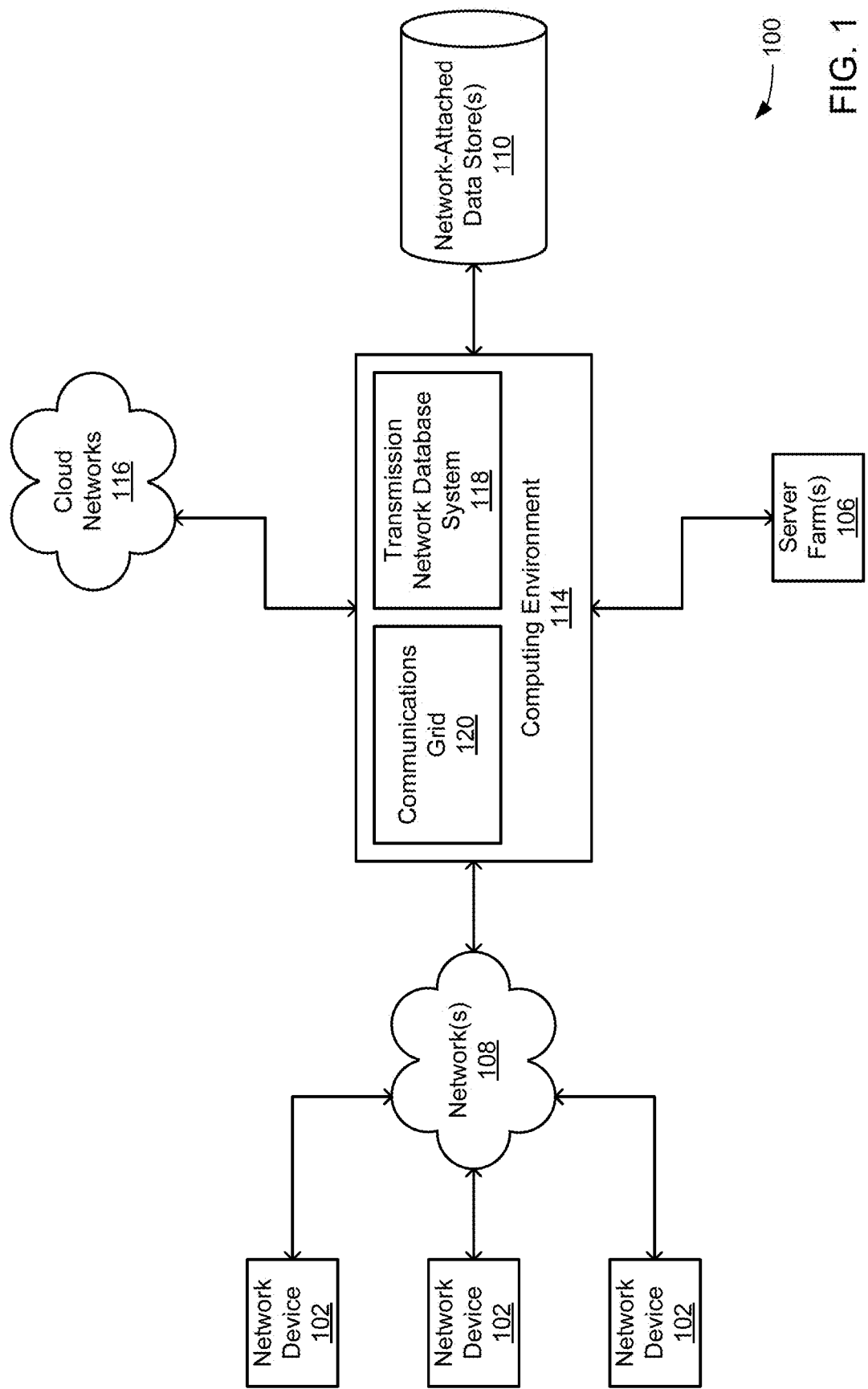
FIG. 1 shows an example of the hardware components of a data transmission network according to some aspects of the present disclosure.

In the appended figures, similar components or features can have the same reference number. Further, various components of the same type may be distinguished by following the reference number with a lowercase letter that distinguishes among the similar components. If only the first reference number is used in the specification, the description is applicable to any one of the similar components having the same first reference number irrespective of the lowercase letter.

DETAILED DESCRIPTION

Certain aspects and features of the present disclosure related to computerized engines and interfaces for assisting in the creation of a custom forecasting model for a forecasting project. As one example, a computer system can execute forecasting software designed to assist the user in creating a forecasting project. The forecasting software can generate a graphical user interface (GUI) through which a user can select time series data for a forecasting project. The time series data can include one or more time series. The GUI can also have an option for the user to create a custom forecasting model to apply to the time series data as part of the forecasting project. If the user chooses to create a custom forecasting model, the forecasting software can help guide the user through the model-creation process, for example by intelligently filtering the options presented to the user and validating the user's selections. This type of validation system for time series models can help ensure that the user creates a valid model that is unlikely to experience operational problems, such as errors or low accuracy (e.g., as a result of invalid inputs, out-of-bound values, etc.), when applied to the time series data. The user may also be able to explore, edit, update, and copy previously generated custom forecasting models, which can significantly expedite and simplify the process.

More specifically, in some examples the user can select time series data for the forecasting project. The forecasting software can analyze the time series data to determine one or more types of forecasting models that are compatible with the time series data. The forecasting software can then update the GUI to list only those types of forecasting models and limit the user's selection to only those types of forecasting models.

After the user selects one of the listed types of forecasting models, the forecasting software can determine parameters associated with the selected type of forecasting model. The parameters can be hyperparameters or other parameters associated with the selected type of forecasting model. For each determined parameter, the forecasting software can further determine candidate values for the parameter and output only those candidate values in the GUI as options for that parameter. For example, the forecasting software may determine seven candidate values for a given parameter. The forecasting software may then update the GUI to include a menu that only lists those seven candidate values as options for that parameter. In some examples, the forecasting software may determine the candidate values for a given parameter based on statistical information derived from the time series data. In this way, both the choices of forecasting models and the model's parameter values can be tailored based on the time series data selected by the user.

Next, the user can use the GUI to select values for the parameters. The forecasting software can receive the selected values and validate them. The forecasting software can validate each selected value individually and in combination with other selected values. The forecasting software can perform this validation by executing a rules engine that is configured to apply a predefined set of rules. If any of the selected values are individually invalid or conflict with other values, the forecasting software can generate an error message to notify the user of the problem. The forecasting software may also prevent the generation of the custom forecasting model, for example by disabling a button that would normally be selectable to create the model. In this way, the forecasting software may prevent a custom forecasting model from being generated that could experience operational problems when applied to the time series data.

To resolve the problem, the user may select new values for the parameters. The new values may undergo a similar validation process. If the new values are valid, the forecasting software may allow the generation of the custom forecasting model, for example by re-enabling the button. If the user selects the button, the forecasting software can generate the custom forecasting model. The custom forecasting model may then be applied to the time series data when the project is run.

Using the above techniques, the forecasting software can prevent the generation of a custom forecasting model that would likely have operational problems. This may yield a variety of advantages. For example, it may be computationally intensive to create a custom forecasting model. Specifically, the model-creation process may consume a considerable amount of processing power and memory. The resulting custom model may also be fairly large in size (e.g., several gigabytes) and thus consume a considerable amount of storage space. By preventing the generation of problematic models, the forecasting software can avoid wasting this processing power, memory, and storage space. It may also be frustrating for a user to expend significant amount of time in trying to customize and generate a forecasting model that ultimately does not behave as desired. But the forecasting software described herein can avoid this frustration and wasted time by helping guide the user into selecting valid models and valid values for model parameters that would yield an acceptable result. Additionally, the process of constructing a custom forecasting model, and in particular selecting valid values for model parameters, is normally a complex and cumbersome process that requires significant expertise in model development. This can make it challenging for the average user to construct a custom forecasting model. But the forecasting software described herein can simplify the process of constructing a custom forecasting model, thereby opening the door to a wider variety of users that may have less experience in model development. For example, the forecasting software can provide only the valid models to the user, so that the user does not have to experiment with invalid models. The forecasting software can also provide helpful hints and error messages for options that should not be selected, to help guide the model generation process for more novice users. The forecasting software can also automatically determine whether the custom forecasting model will fail (e.g., based on the individual and combination of settings provided by the user) and guide the user into taking corrective action, before expending further time and computing resources on generating an operable forecasting model.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
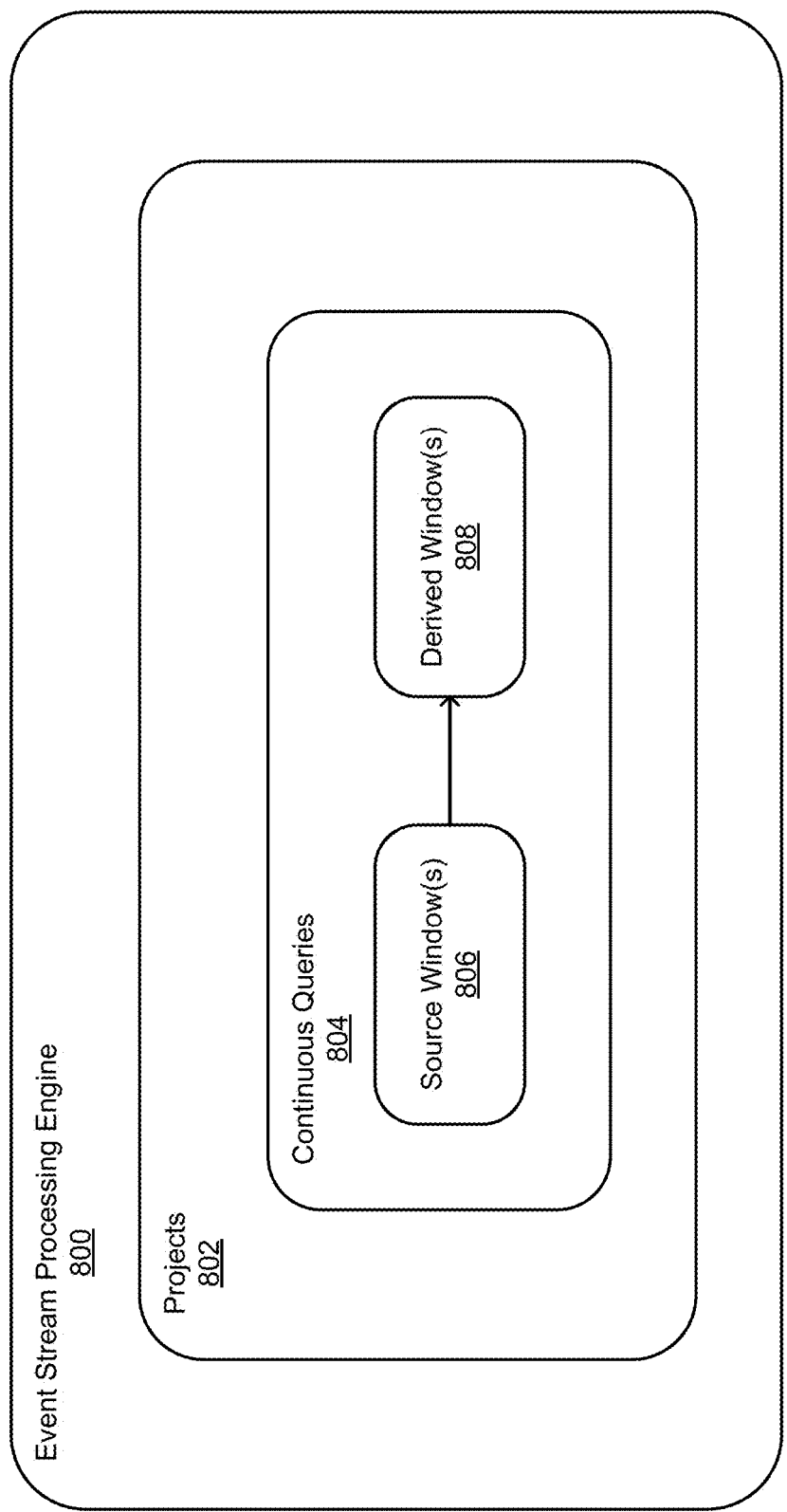
FIG. 8 shows a block diagram including components of an Event Stream Processing Engine (ESPE) according to some aspects of the present disclosure.
Figure 9:
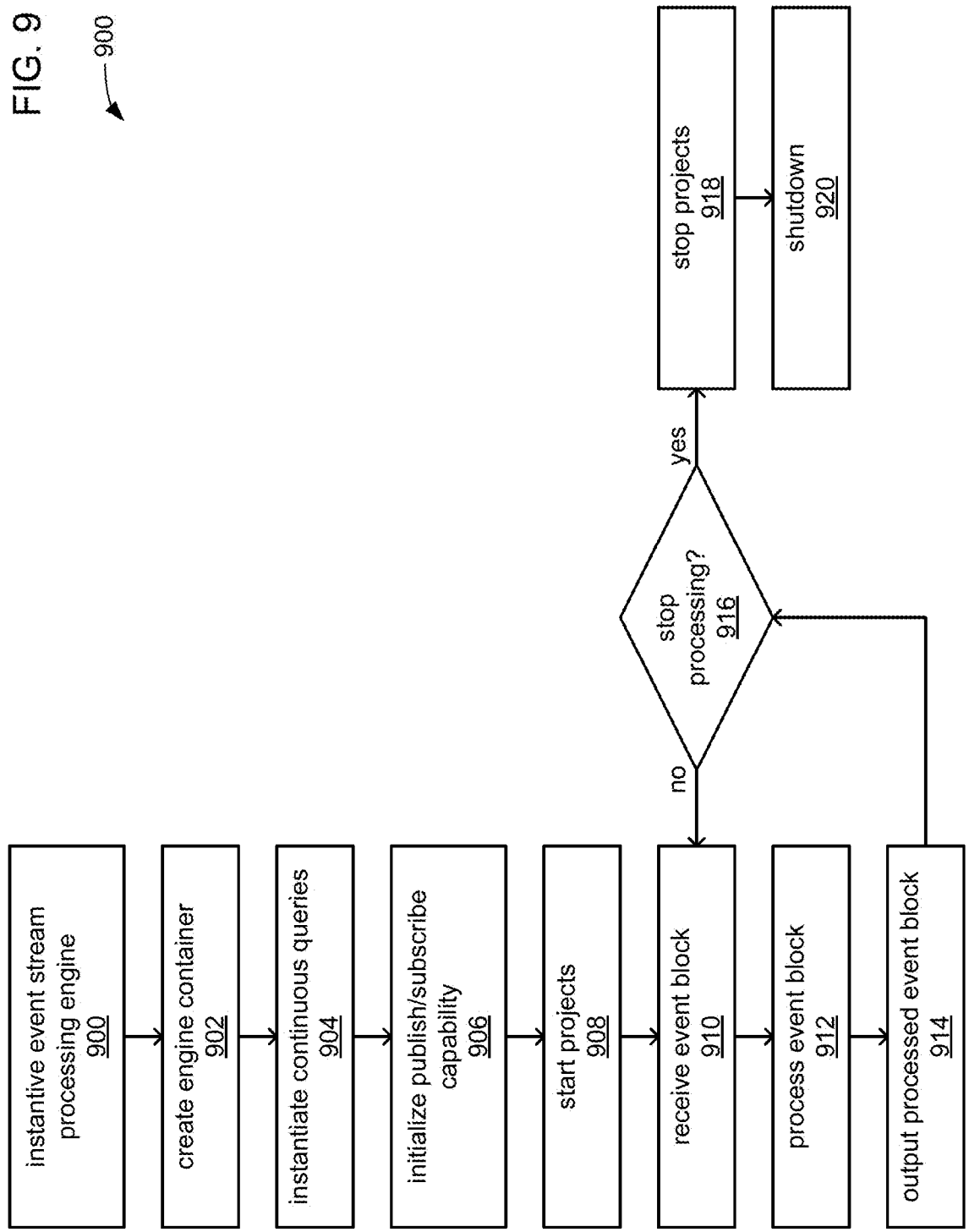
FIG. 9 shows a flow chart of an example process including operations performed by an event stream processing engine according to some aspects of the present disclosure.
Figure 10:
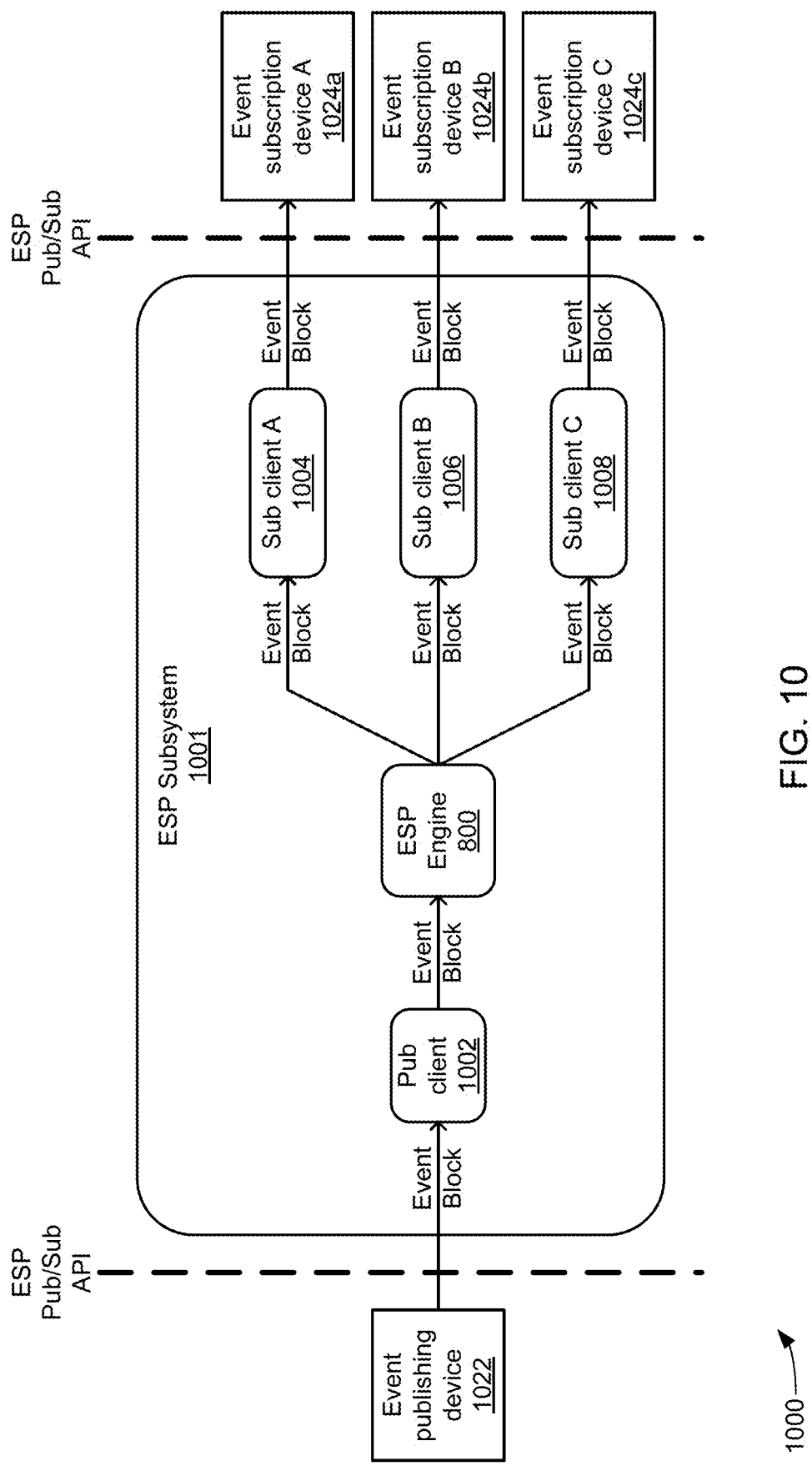
FIG. 10 shows an ESP system interfacing between publishing device and event subscribing devices according to some aspects of the present disclosure.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect over time. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
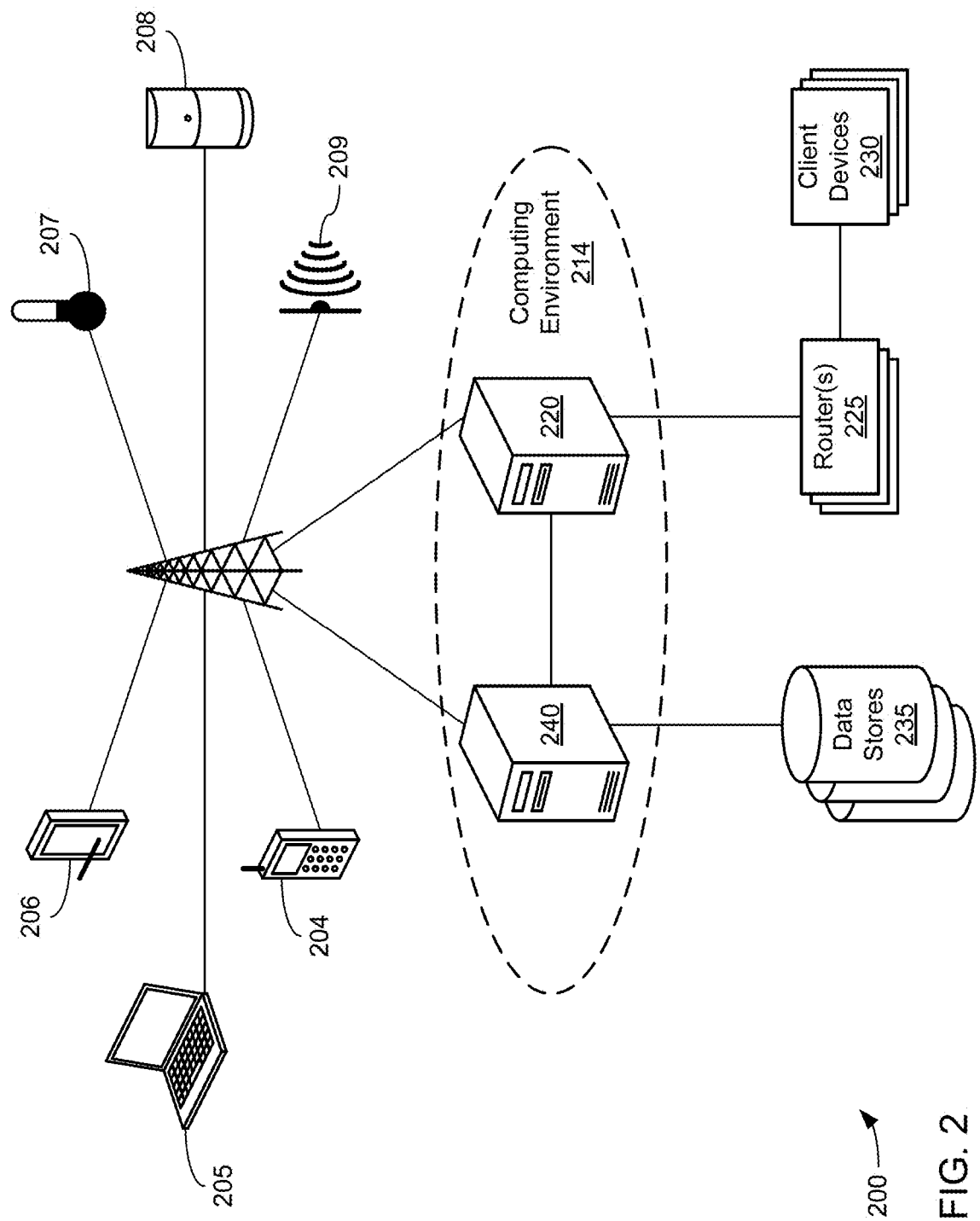
FIG. 2 shows an example network including an example set of devices communicating with each other over an exchange system according to some aspects of the present disclosure.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments.

Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
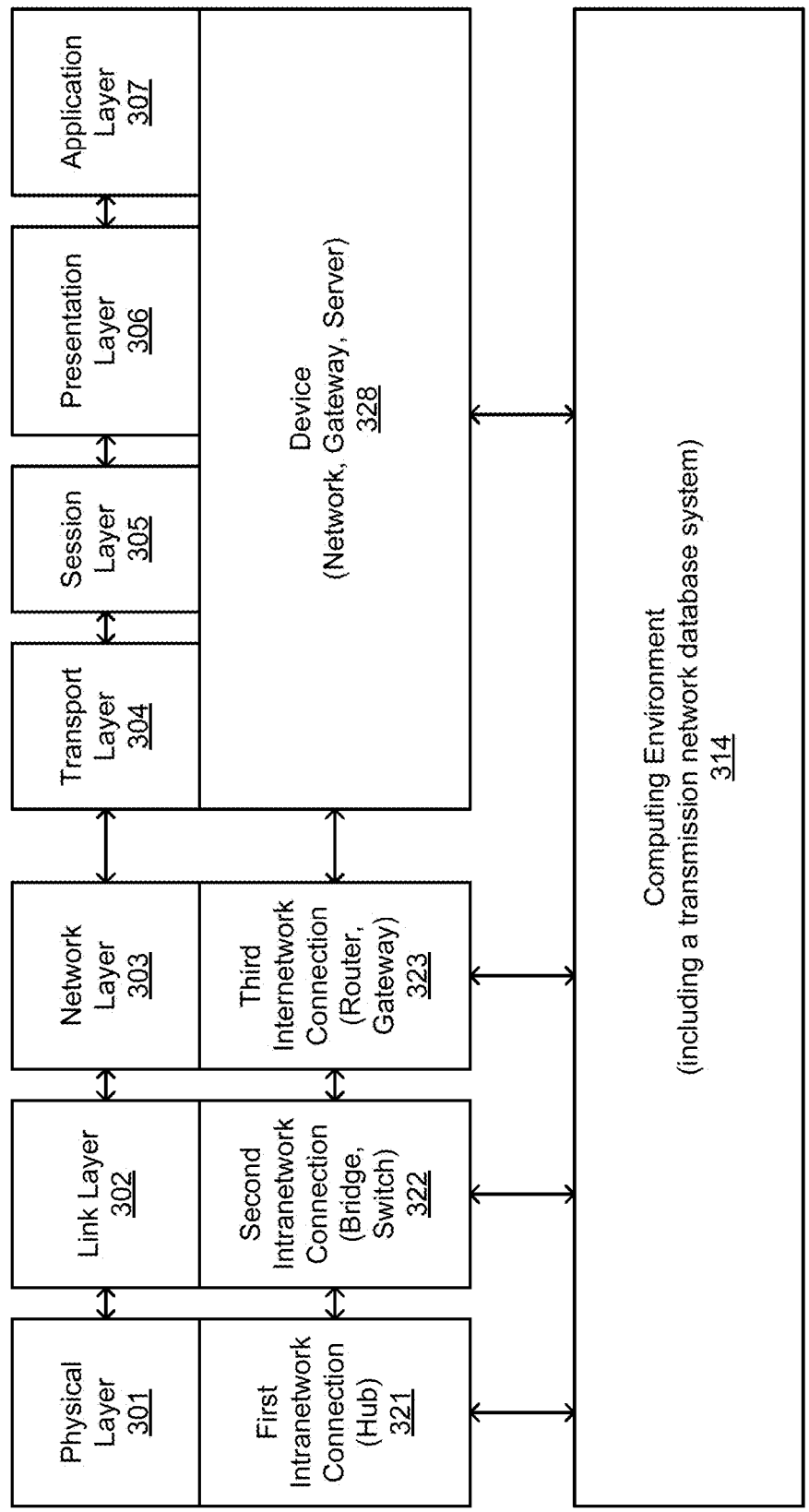
FIG. 3 shows an example representation of a conceptual model of a communications protocol system according to some aspects of the present disclosure.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
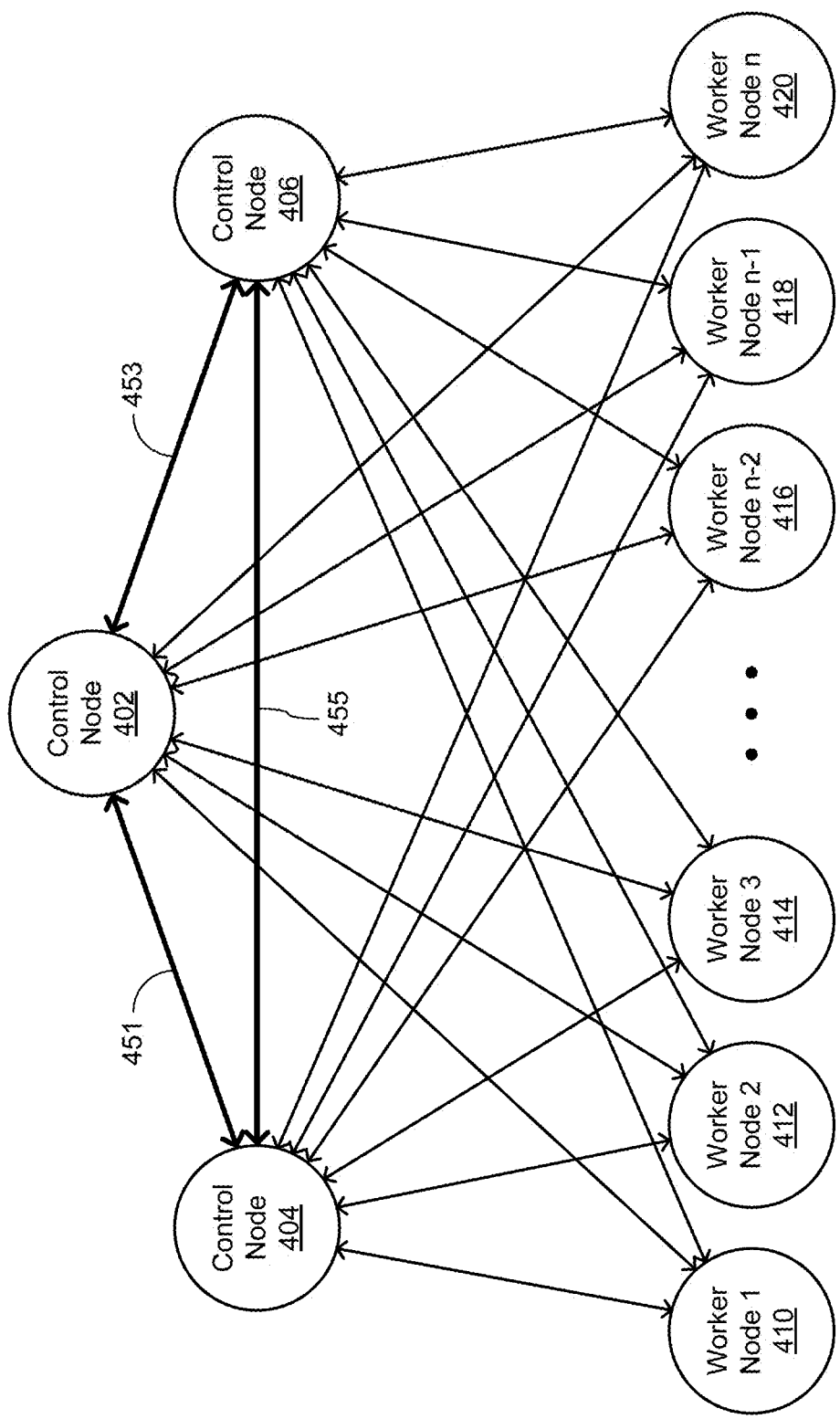
FIG. 4 shows a communications grid computing system including a variety of control and worker nodes according to some aspects of the present disclosure.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which the primary control node is accepting connections from peer nodes, among others. The information may also be provided in a configuration file, transmitted over a secure shell tunnel, or received from a configuration server, among others.

While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
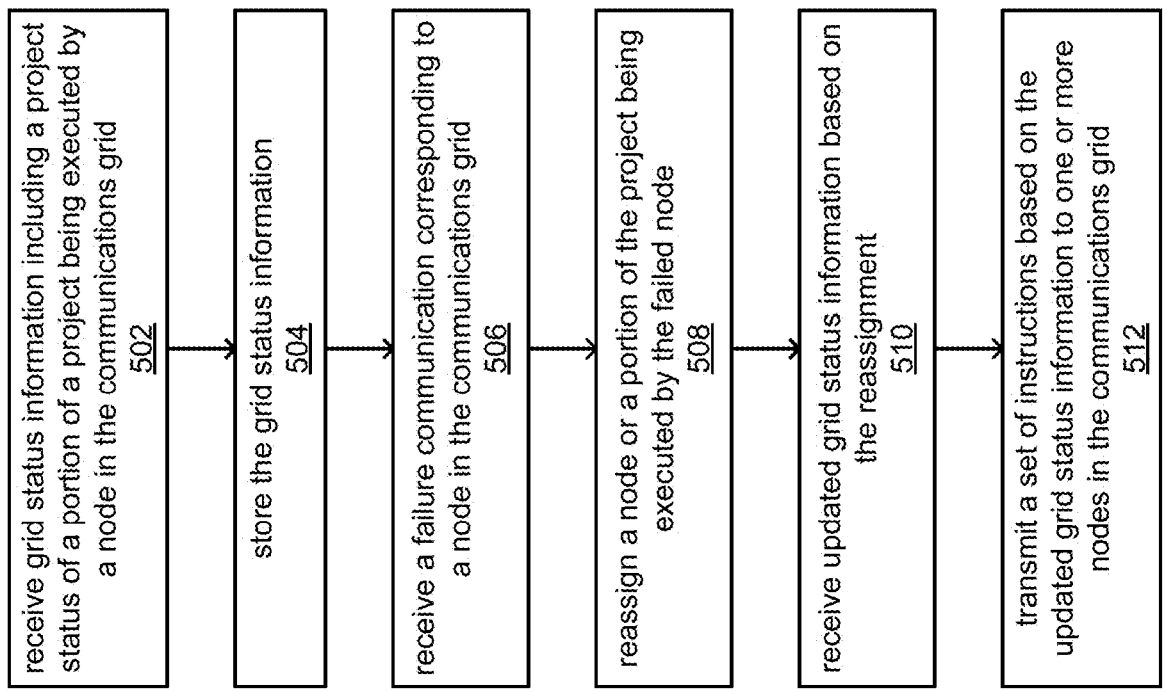
FIG. 5 shows a flow chart showing an example process for adjusting a communications grid or a work project in a communications grid after a failure of a node according to some aspects of the present disclosure.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
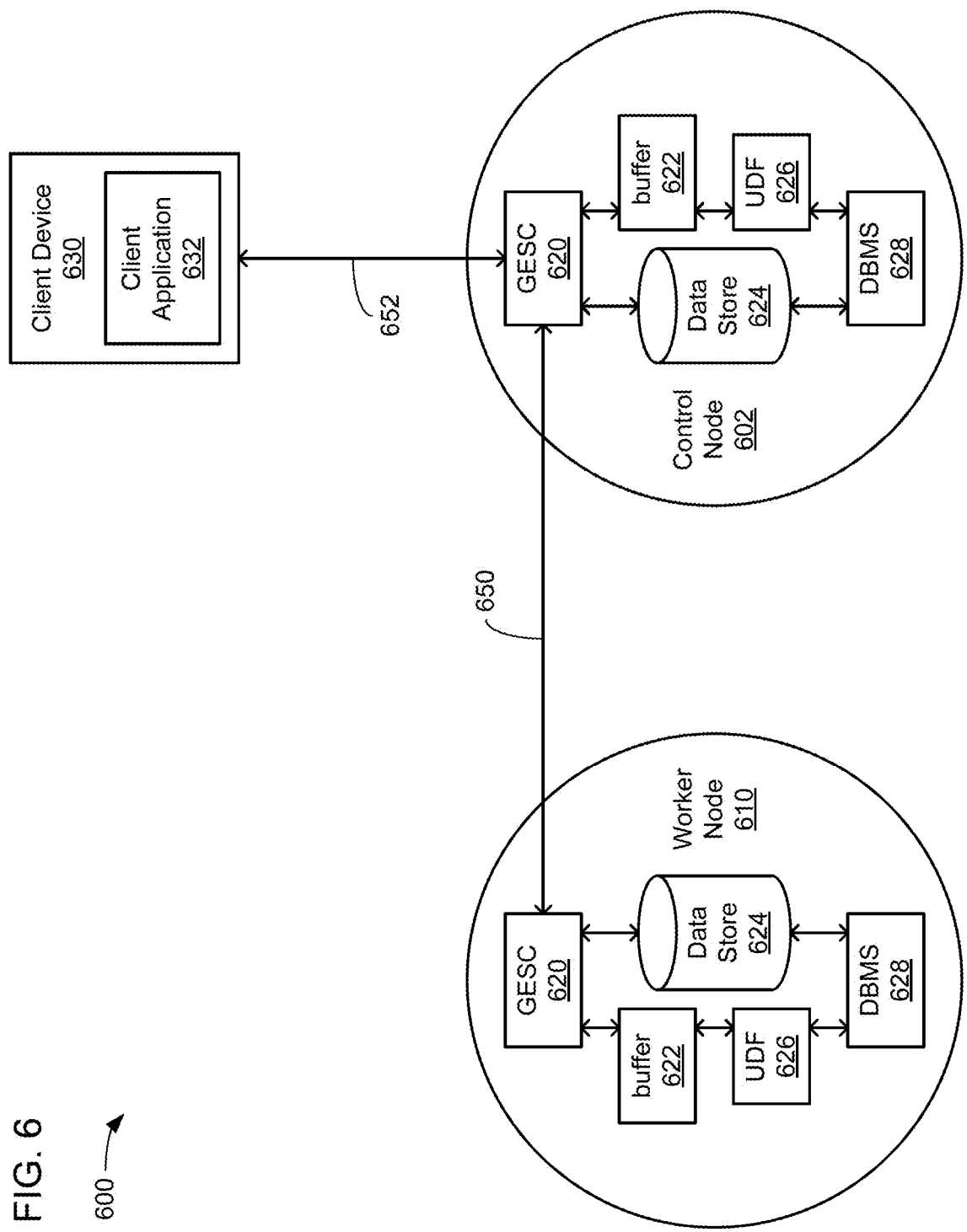
FIG. 6 shows a portion of a communications grid computing system including a control node and a worker node according to some aspects of the present disclosure.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
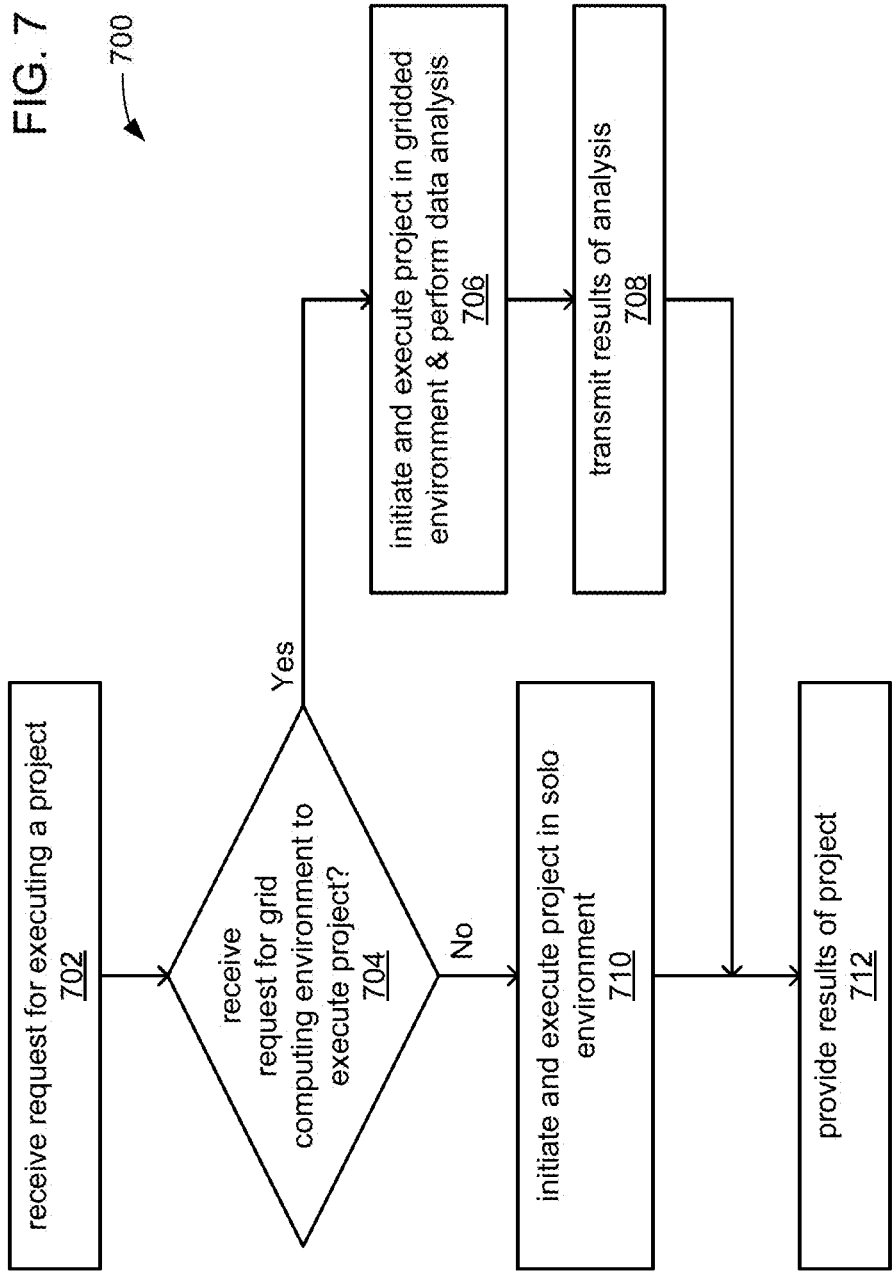
FIG. 7 shows a flow chart showing an example method for executing a project within a grid computing system according to some aspects of the present disclosure.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
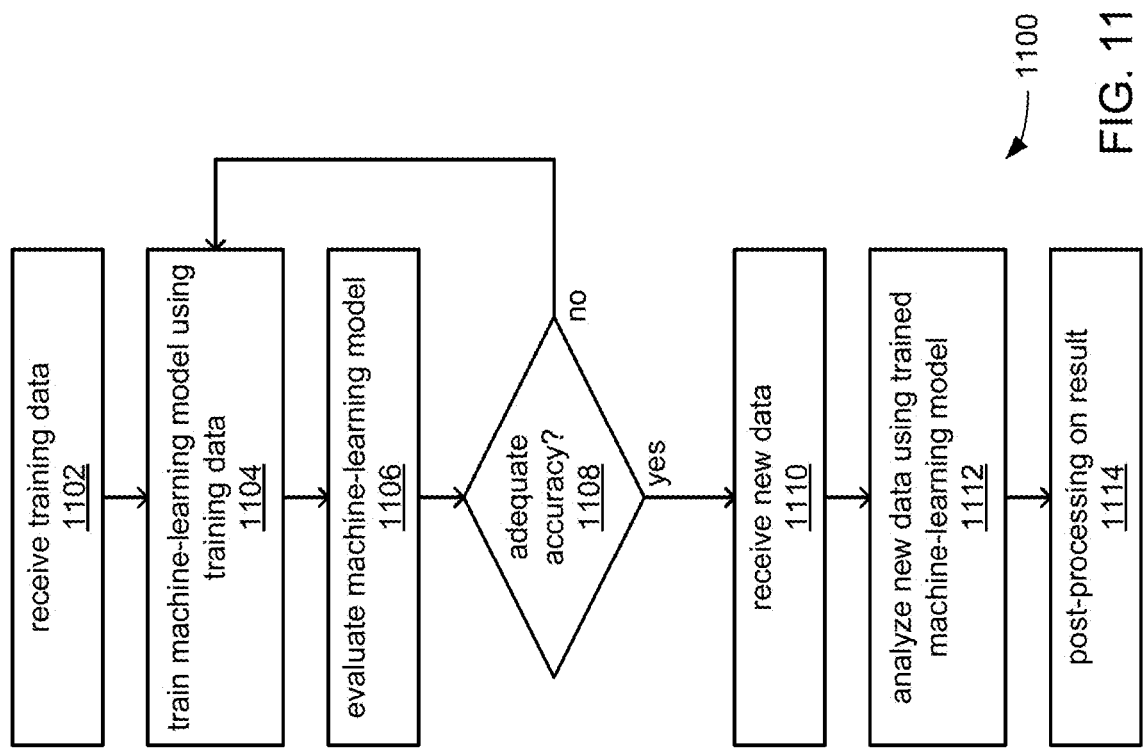
FIG. 11 shows a flow chart of an example process for generating and using a machine-learning model according to some aspects of the present disclosure.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
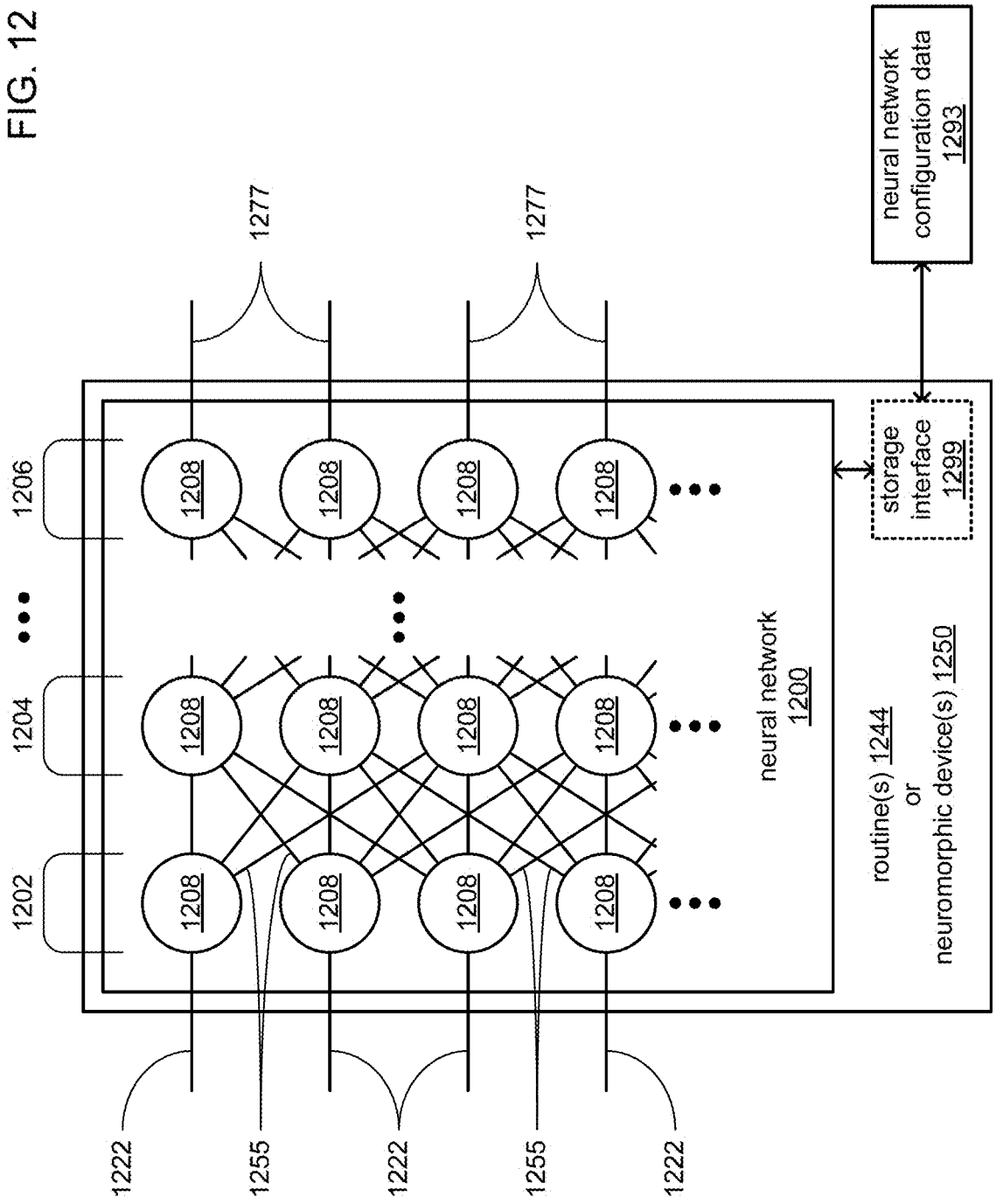
FIG. 12 shows a node-link diagram of an example of a neural network according to some aspects of the present disclosure.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
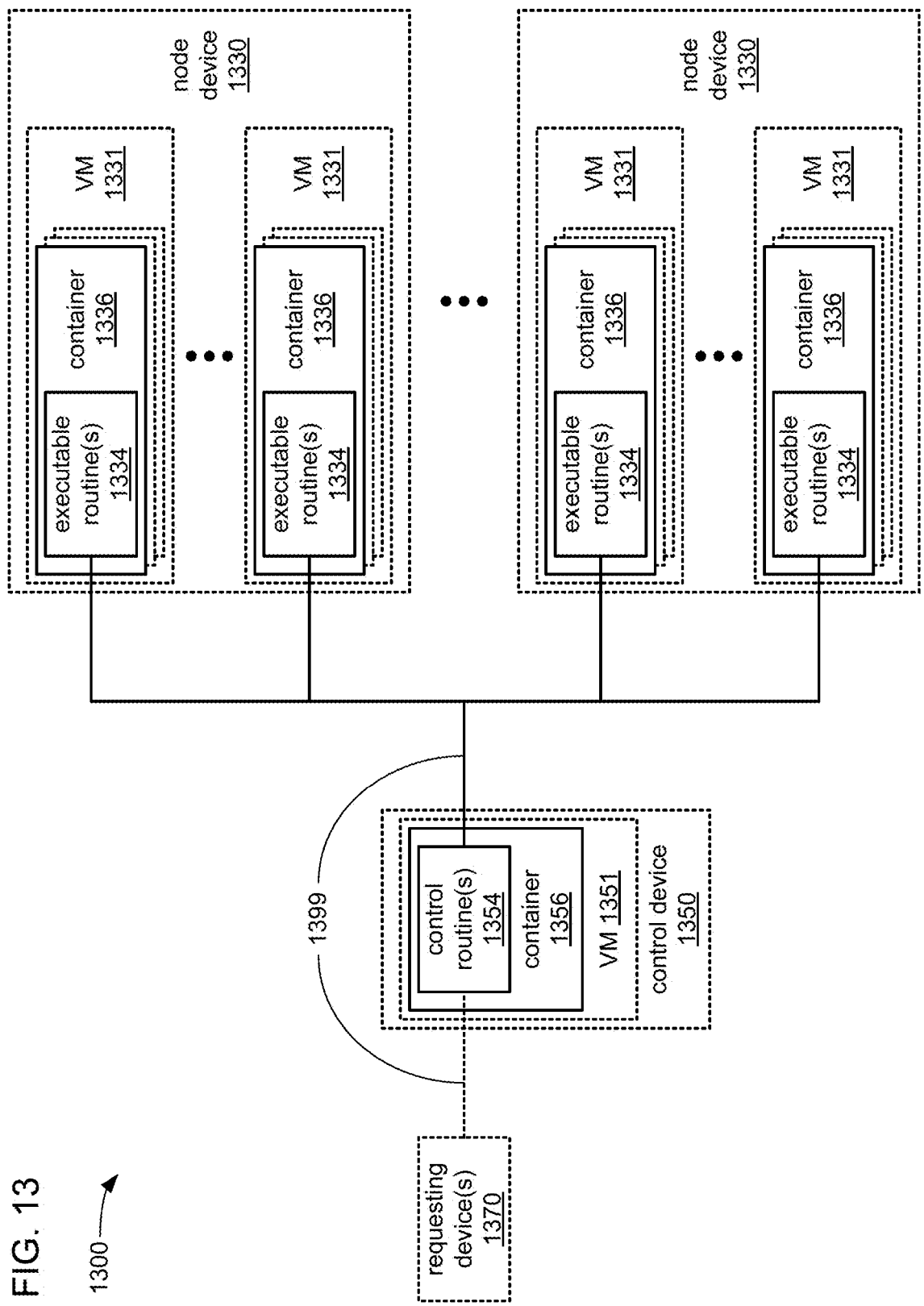
FIG. 13 shows various aspects of the use of containers as a mechanism to allocate processing, storage and/or other resources of a processing system to the performance of various analyses according to some aspects of the present disclosure.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, Calif., USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
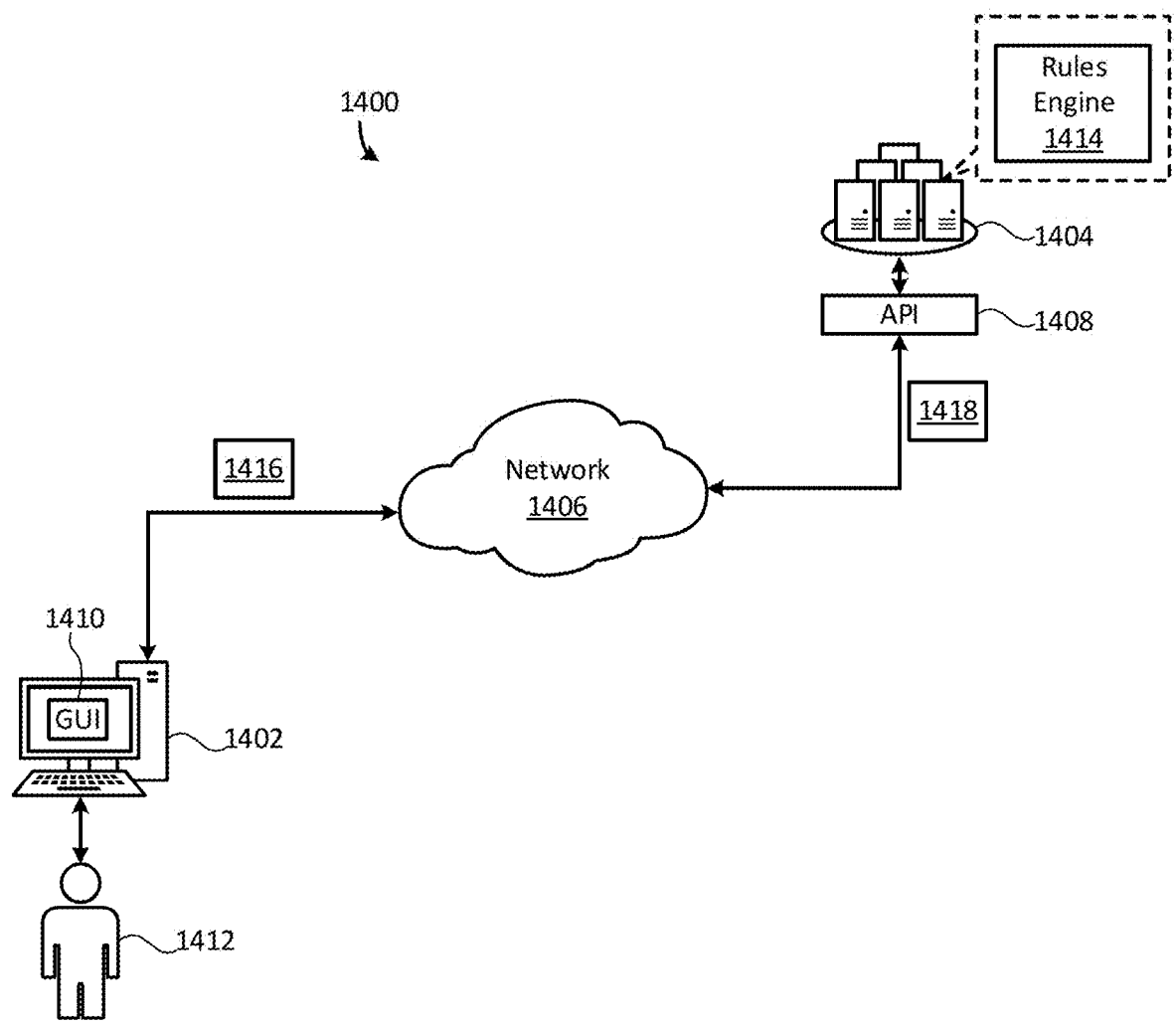
FIG. 14 shows a block diagram of an example of a system for implementing some aspects of the present disclosure.

FIG. 14 shows a block diagram of an example of a system 1400 for implementing some aspects of the present disclosure. The system 1400 includes a client device 1402 in communication with a server system 1404 via a network 1406, such as the Internet. Examples of the client device 1402 can include a laptop computer, desktop computer, mobile phone, tablet, e-reader, or wearable device. The server system 1404 can include any number and combination of servers. The client device 1402 can communicate with the server system 1404 via an application programming interface (API) 1408, for example by issuing commands 1416 to the API.

The client device 1402 and the server system 1404 can coordinate with one another to implement forecasting software. For example, the client device 1402 may implement a frontend of the forecasting software and the server system 1405 may implement a backend of the forecasting software. In some cases, the forecasting software may be provided by the server system 1404 as a web application that is accessible to the client device 1402 via a website browser.

The forecasting software can allow a user 1412 to create a forecasting project through which one or more forecasting models can be applied to one or more time series datasets to produced one or more predicted forecasts. Examples of such forecasting models can include an exponential smoothing model (ESM), an autoregressive (AR) model, a moving average (MA) model, an autoregressive integrated moving average (ARIMA) model, a vector autoregressive (VAR) model, a neural network, etc. A predicted forecast can be a forecast of predicted values over a future time window.

The forecasting software can include a graphical user interface (GUI) 1410, which may be output on a display of the client device 1402 to a user 1412. The user 1412 can interact with the GUI 1410 to provide inputs to, and receive outputs from, the graphical user interface 1410. For example, the user 1412 can interact with the GUI 1410 to select time series data for a forecasting project, to select a type of forecasting model to be applied to the time series data in the forecasting project, and to initiate execution of the selected forecasting model on the time series data. The client device 1402 and the server system 1404 may coordinate with each other to implement this functionality. For example, the client device 1402 can transmit commands 1416 via the API 1408 to the server system 1404 indicating the selected time series data and the selected forecasting model. The selected time series data may include one time series dataset or multiple time series datasets. Based on the commands 1416, the server system 1404 can apply the selected forecasting model to the selected time series data and return the results (e.g., a forecast over a future timespan) to the client device 1402 via the API 1408.

In some examples, the forecasting software can allow the user to select a premade forecasting model to apply to the time series data from among a group of premade forecasting models. For example, the user 1412 may be able to select a forecasting model from among a group of premade forecasting models that are listed in a menu of the GUI 1410. The group of premade forecasting models may be stored on the client device 1402 and/or the server system 1404. The group of premade forecasting models may have been previously created by the user 1412 and/or by a model developer other than the user 1412. After selecting a premade forecasting model, the user 1412 can select a button in the GUI 1410 to apply the premade forecasting model to the selected time series data.

The forecasting software may also allow the user 1412 to create a custom forecasting model. If the user 1412 decides to create a custom forecasting model, the user 1412 may be able to select a type of forecasting model from a predefined list of forecasting model types and then input values for one or more parameters of the selected model. For example, the user 1412 can select a type of forecasting model from among a predefined list of forecasting model types that are listed in a menu of the GUI 1410. The GUI 1410 may then present the user 1412 with one or more graphical elements through which the user 1412 can select one or more values for one or more parameters of the selected model type. Examples of the graphical elements can include input boxes, menus (e.g., dropdown menus), sliders, numeric steppers, radio boxes, checkboxes, or any combination of these. The customizable parameters may be hyperparameters or other types of parameters for the forecasting model.

In some examples, the forecasting software can dynamically limit which values are available for selection by the user 1412 for a given customizable parameter. For example, the forecasting software can analyze the selected time series data to determine statistical information about the time series data. Examples of the statistical information can include a mean of the time series data, a standard deviation associated with the time series data, a maximum value of the time series data, a minimum value of the time series data, a number of observations in the time series data, or any combination of these. Based on the statistical information and potentially other factors, the forecasting software may determine which values to allow for a particular customizable parameter. The forecasting software may then limit the values within the options for that particular customizable parameter to only the valid (e.g., allowed) values, or restrict the user to only be allowed to enter the valid values.

For example, the system 1400 (e.g., the server system 1404 or the client device 1402) can analyze the time series data to derive the statistical information, from which the system 1400 can determine a range of values that are allowable for a customizable parameter. The system 1400 may determine the range of values by applying a rules engine 1414 based on the statistical information. Although shown as part of the server system 1404, it will be appreciated that the rules engine 1414 may additionally or alternatively be part of the client device 1402. The range of values may include candidate values that the system 1400 has deemed individually valid for the customizable parameter (though the candidate values may be invalid when combined with other values for other parameters, as described in greater detail later on). The system 1400 may then present the range of values to the user 1412 for selection via a graphical element. For example, the client device 1402 may output a menu in the GUI 1410 that only includes the range of values selected by the forecasting software. This process can be applied to some or all of the customizable parameters, so as to limit the user's inputs and thereby help guide the user 1412 in making valid selections for the values of the customizable parameters.

After the user 1412 inputs the values for the customizable parameters, the forecasting software can implement a validation process to validate the values supplied by the user 1412. For example, the forecasting software can validate each value individually and in combination with the other values. The forecasting software can perform this validation to determine whether the values would violate any rules in a predefined set of rules, which may be configured to identify situations where conflicts exist between values or other situations where the values are otherwise unsuitable for the selected type of forecasting model. Examples of such rules that can be used for the validation process are described in greater detail later on with respect to FIGS. 28-33.

To perform the abovementioned validation, the system 1400 may execute the rules engine 1414 to apply the predefined set of rules to the selected values for the customizable parameters. If a conflict exists between two or more values, or a value is otherwise invalid, it may produce an operational problem with respect to the forecasting model. For example, the forecasting model may experience an error (e.g., crash) or generate inaccurate results. To help avoid this, the system 1400 can output an error message indicating the problem in the GUI 1410. For example, the server system 1404 can transmit a notification 1418 indicating the problem to the client device 1402. The client device 1402 may receive the notification 1418 and responsively output an error message indicating the problem in the GUI 1410. Additionally or alternatively, the client device 1402 may apply at least some of the rules on the client side to locally perform at least some of the validation process and output corresponding error messages. This can avoid the latency and bandwidth consumption normally resulting from communicating with the server system 1404.

If a problem is detected, in some examples the system 1400 may also determine a recommendation to resolve the problem (e.g., based on the predefined set of rules). The system 1400 can then incorporate the recommended solution into the error message. For example, the server system 1404 can incorporate the recommended solution into the notification 1418 to the client device 1402, which can then display the recommended solution as part of the error message.

If a conflict exists between two or more values (e.g., as determined based on the predefined set of rules), or a value is invalid, the forecasting software may prevent the custom forecasting model from being generated at least until the problem is resolved. For example, the client device 1402 may ignore commands to generate the custom forecasting model and disable a button for generating the custom forecasting model in the GUI 1410. Warning messages (e.g., inline warning messages) may also be output to help the user 1412 identify or rectify the problem. The user 1412 may then adjust one or more of the values to new values in an effort to resolve the problem. The forecasting software can detect this adjustment and validate the new values, for example using a similar process as described above. If no problems are detected with respect to the new values, the forecasting software may allow the custom forecasting model to be generated. For example, the client device 1402 can enable the button for generating the custom forecasting model in the GUI 1410. The user 1412 can select the button to initiate generation of the custom forecasting model (e.g., the selected type of forecasting model with the custom parameter values). The forecasting software may then generate the custom forecasting model on the client device 1402 or the server system 1404 for use in the forecasting project.

Figure 15:
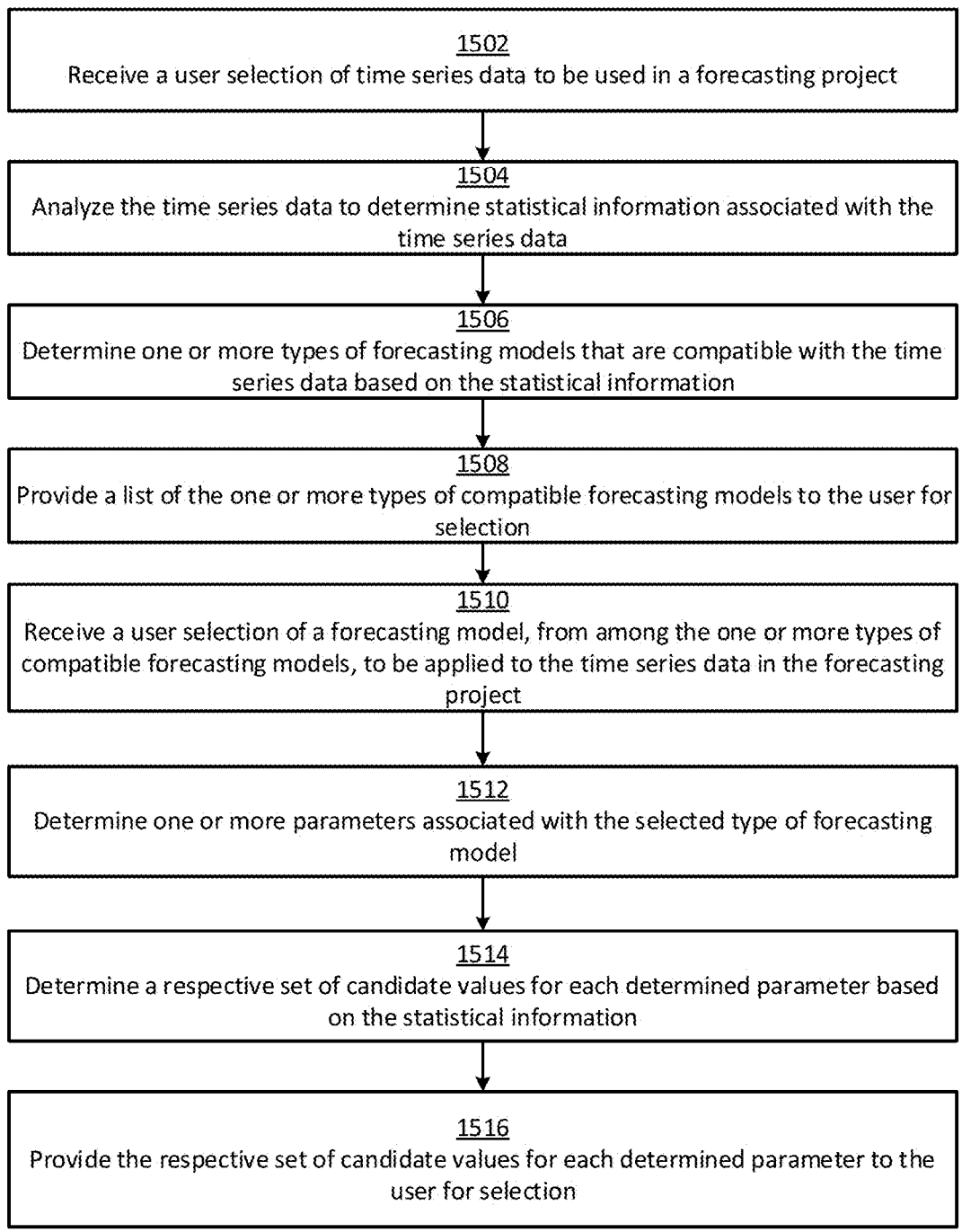
FIG. 15 shows a flowchart of an example of a process for determining candidate values for parameters of a selected type of forecasting model according to some aspects of the present disclosure.

One example of part of the above process is shown in FIG. 15. Other examples may include more operations, fewer operations, different operations, or a different order of operations than in shown in FIG. 15. The process of FIG. 15 is described below with respect to the components of FIG. 14 for simplicity, but it will be appreciated that the process can be applied using any of the systems and techniques described above with respect to FIGS. 1-13.

In block 1502, the forecasting software receives a user selection of time series data to be used in a forecasting project. For example, the user 1412 can input their selection via the GUI 1410 on the client device 1402. The client device 1402 may then upload the selected time series data to the server system 1404, for example if the server system 1404 does not already have the selected time series data. If the server system 1404 already has the time series data, then the client device 1402 may simply transmit a command 1416 to the API 1408 of the server system 1404 indicating the selected time series data. The time series data may include one time series dataset or multiple time series datasets.

In block 1504, the forecasting software analyzes the time series data to determine corresponding statistical information. For example, the system 1400 (e.g., the client device 1402 and/or server system 1404) can analyze the time series data to determine the statistical information. Examples of the statistical information can include a mean, a standard deviation, a maximum value, a minimum value, a number of observations, or any combination of these. If the time series data includes multiple time series, the forecasting software can determine a respective set of statistical information for each time series dataset.

In block 1506, the forecasting software determines one or more types of forecasting models that are compatible with the time series data based on the statistical information. For example, certain types of forecasting models may break or provide inaccurate results when applied to time series data with certain statistical values. So, the system 1400 can determine which types of forecasting models are compatible with the statistical information derived in block 1504. To do so, the system 1400 may store one or more lookup tables or rules that match types of forecasting models to their permissible statistical values. The system 1400 can access this data to determine which types of forecasting models are compatible, or incompatible, with the statistical information.

In block 1508, the forecasting software provides a list of the one or more types of compatible forecasting models to the user 1412 for selection. For example, the server system 1404 can indicate the one or more types of compatible forecasting models to the client device 1402, which in turn can list the one or more types of compatible forecasting models in the GUI 1410. For instance, the client device 1402 may update the GUI 1410 to specify the one or more types of compatible forecasting models in a list or menu, through which the user 1412 can select one of the compatible forecasting models for further customization.

In block 1510, the forecasting software receives a user selection of a forecasting model, from among the one or more types of compatible forecasting models, that is to be applied to the time series data in the forecasting project. For example, the user 1412 can input their selection via the GUI 1410 on the client device 1402. The user 1412 may input their selection by, for example, selecting an option corresponding to a desired forecasting model from a dropdown menu. The client device 1402 can detect the selection and may indicate the selection to the server system 1404.

In block 1512, the forecasting software determines one or more user-customizable parameters associated with the selected type of forecasting model. For example, the system 1400 can determine that there are X total parameters associated with the selected type of forecasting model. Among those X total parameters, only N may be user customizable. So, the forecasting software may determine the N parameters that are user customizable. Since different types of forecasting models may have different parameters that are user customizable, the forecasting software can determine the one or more user-customizable parameters based on the specific type of forecasting model that was selected by the user 1412.

In some examples, the forecasting software can determine the one or more user-customizable parameters by referencing a predefined lookup table. The reference table may indicate some or all of the user-customizable for each type of forecasting model. The lookup table may also indicate other parameters that are not user customizable for each type of model.

In block 1514, the forecasting software determines a respective set of candidate values for each determined parameter based on the statistical information. For example, the system 1400 can determine a first set of candidate values for a first user-customizable parameter and a second set of candidate values for a second user-customizable parameter. The first set of candidate values and the second set of candidate values may be determined based on the statistical information. For example, the first set of candidate values may include a range of values that is determined based on (e.g., bounded by) a minimum and maximum value in the statistical information. As another example, the second set of candidate values may include a range of values that is determined based on the number of observations in the time series data, as indicated in the statistical information. In some examples, the candidate values can be determined using a rules engine 1414. For example, the system 1400 may execute the rules engine 1414 to determine the candidate values.

In block 1516, the forecasting software provides the respective set of candidate values for each determined parameter to the user 1412 for selection. For example, the system 1400 can provide the first set of candidate values for the first user-customizable parameter and the second set of candidate values for the second user-customizable parameter to the user 1412 for selection. In some such examples, the server system 1404 can determine the respective set of candidate values for each determined parameter and transmit that information to the client device 1402. Alternatively, the client device 1402 can determine the respective set of candidate values for each determined parameter. Either way, the client device 1402 can obtain (e.g., determine or receive) the respective set of candidate values for each determined parameter. The client device 1402 can then output the respective set of candidate values for each determined parameter in the GUI 1410. For example, the GUI 1410 can include a first menu that indicates the first set of candidate values for the first user-customizable parameter, and a second menu that indicates the second set of candidate values for the second user-customizable parameter.

FIGS. 16-22 show examples of pages of a GUI 1410 for implementing some aspects described above. It will be appreciated that FIGS. 16-22 are intended to be illustrative and non-limiting, and other examples may include more, fewer, or different graphical features than are shown in those figures.

Figure 16:
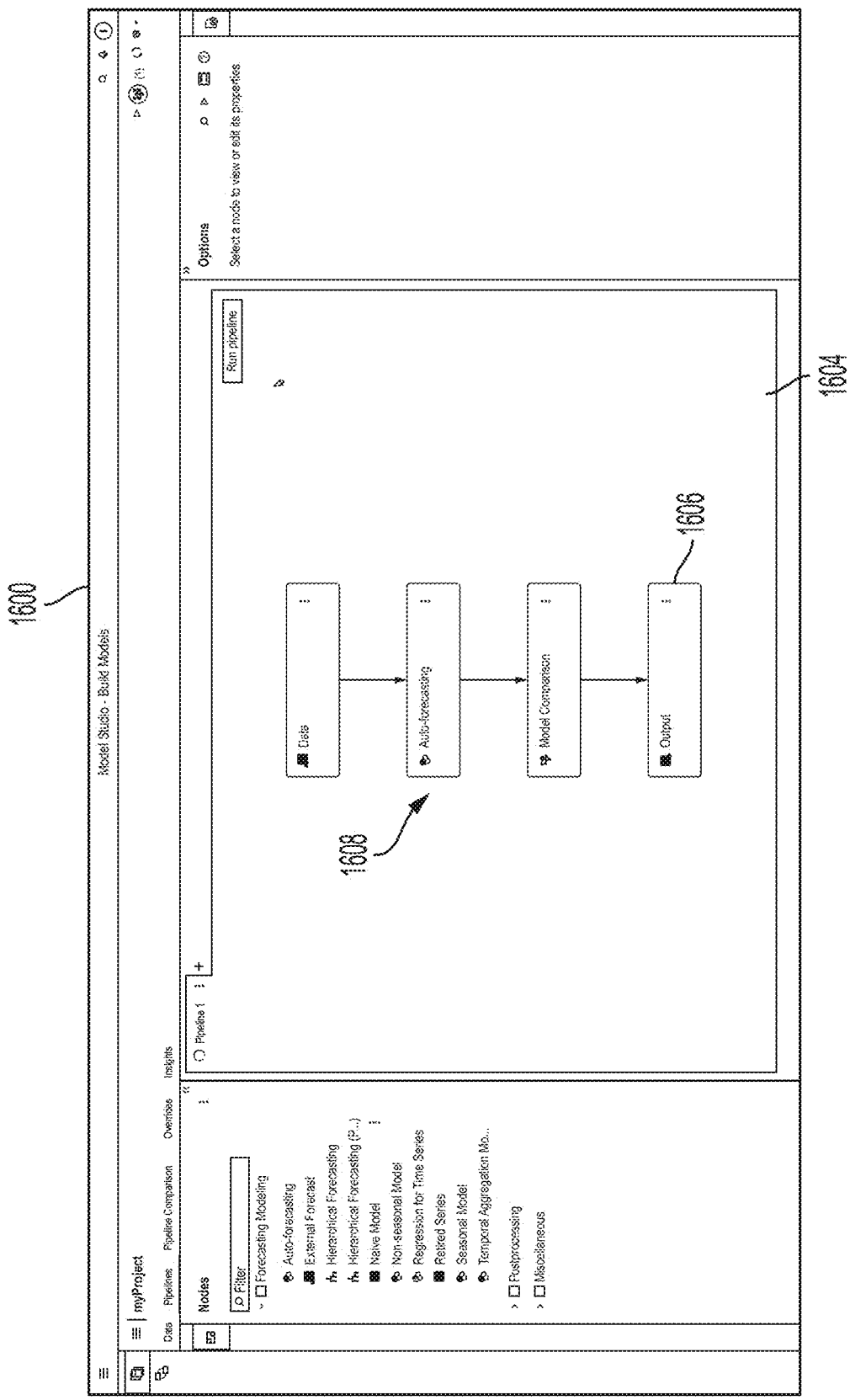
FIG. 16 shows an example of a graphical user interface (GUI) for constructing a pipeline for a forecasting project according to some aspects of the present disclosure.

Referring now to FIG. 16, shown is a GUI page 1600 of forecasting software for building a forecasting project. The GUI page 1600 includes a canvas region 1604 to which a user 1412 can drag-and-drop modules 1606 into a desired sequence to construct a pipeline 1608 for the forecasting project. The modules 1606 may each be configured to perform different functionality, such as data processing, auto-forecasting, model comparison, and output. Data processing may be performed by a data processing module. During data processing, the forecasting software may analyze the selected time series data to determine the statistical information described above. Other preprocessing tasks, such as normalizing and/or cleansing the time series data, may also be performed by the data processing module. Auto-forecasting may involve applying one or more forecasting models to time series data to automatically generate one or more corresponding forecasts. The forecasts may be compared to one another by the model comparison module to determine the most accurate forecast or some other result. The final result may then be output by the output module. Other modules may also be available for use in the pipeline 1608. After constructing the pipeline 1608, the user 1412 may select a button in the GUI page 1600 to run the pipeline 1608.

Figure 17:
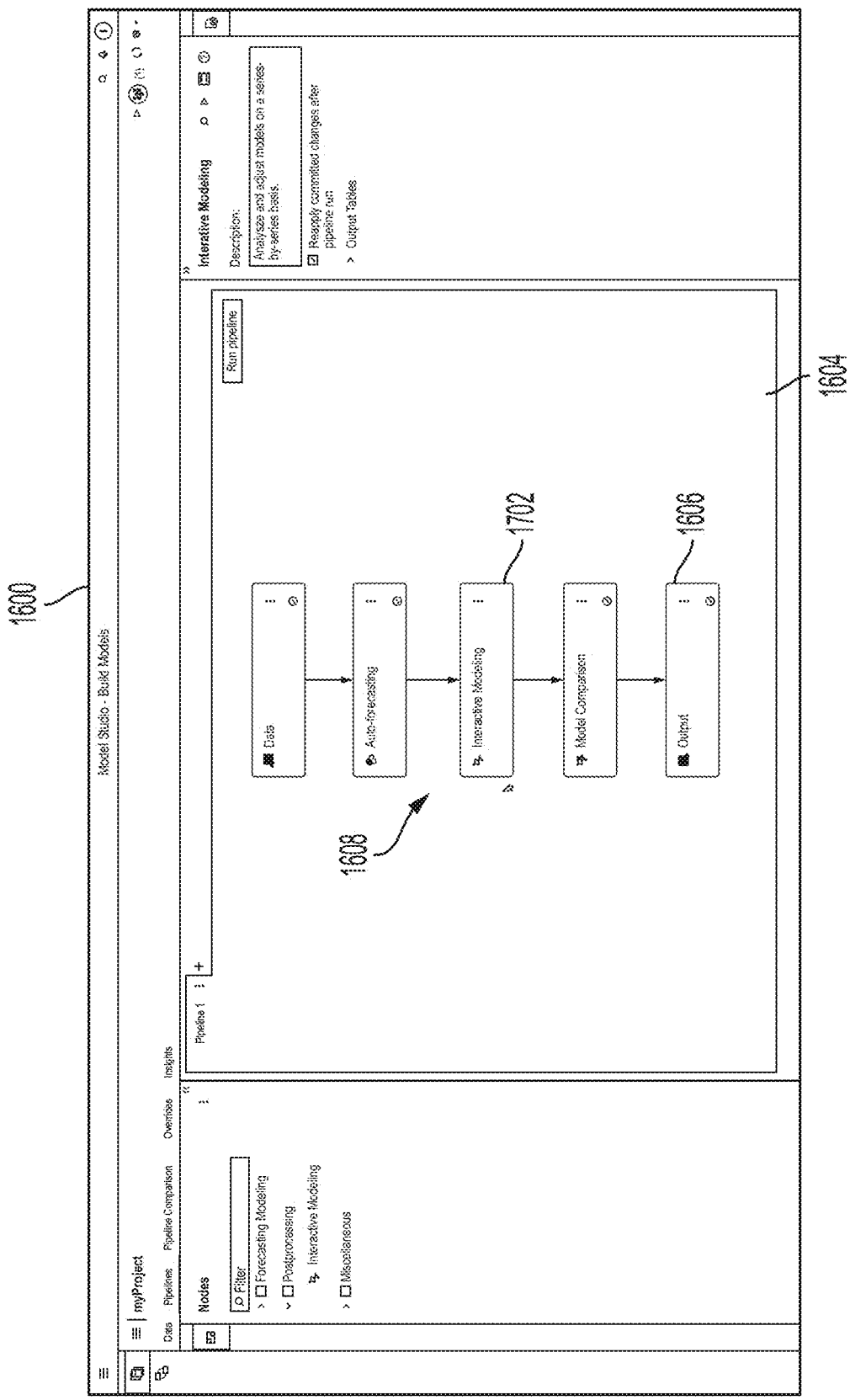
FIG. 17 shows an example of a GUI for adding an interactive modeling module to a pipeline for a forecasting project according to some aspects of the present disclosure.

In some examples, the GUI page 1600 may include the option to add an "interactive modeling" (IM) module to the pipeline 1608, as shown in FIG. 17. The IM module may be a specialized module that enables the user 1412 to view information about the forecasting models used in the auto-forecasting stage as well as to inject their own custom models into the pipeline 1608. The user 1412 can select the "interactive modeling" module, for example by double-clicking on it, to open a corresponding IM window 1800, an example of which is shown in FIG. 18.

Figure 18:
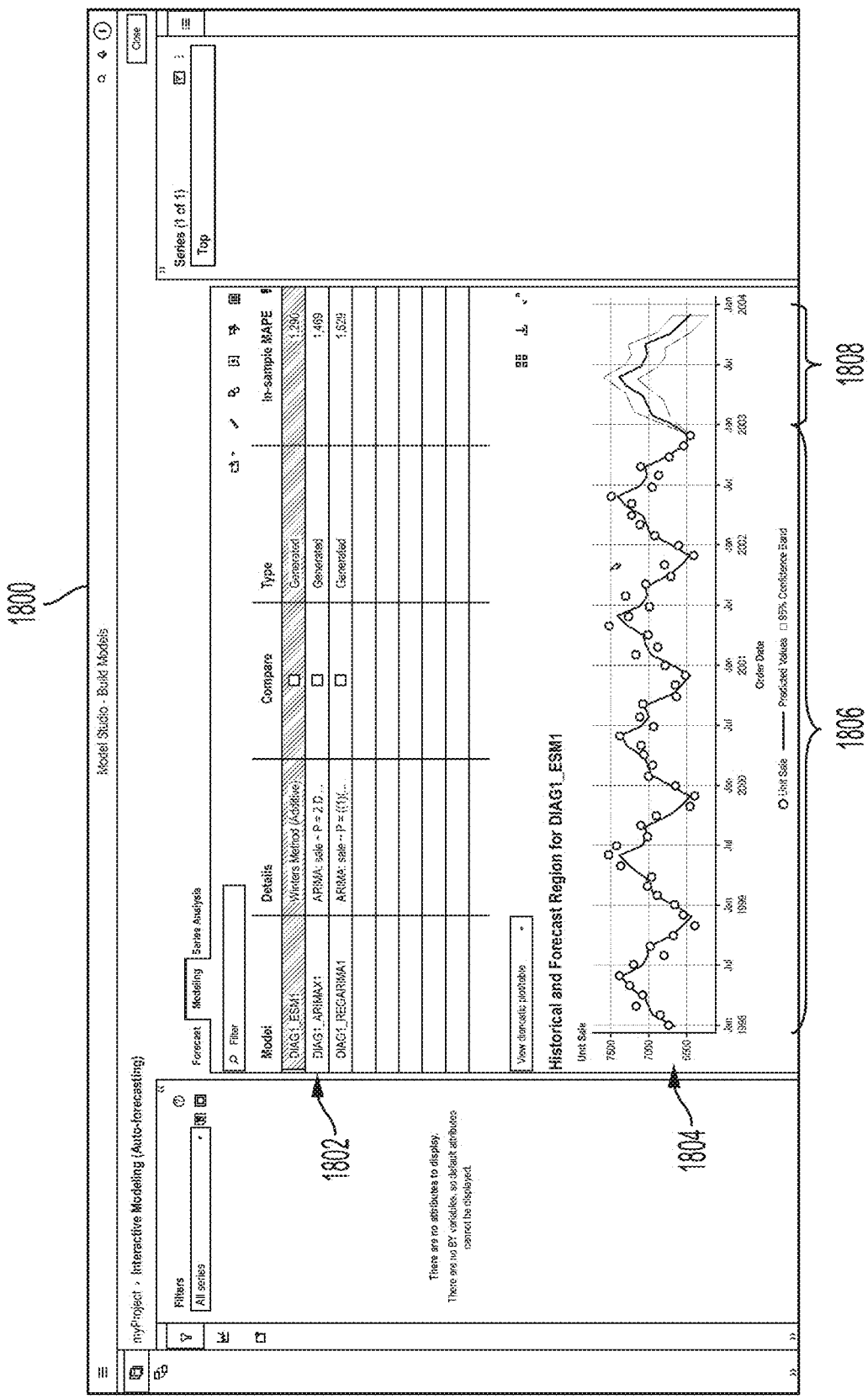
FIG. 18 shows an example of a GUI associated with an interactive modeling module according to some aspects of the present disclosure.

Referring now to FIG. 18, the IM window 1800 may include a list 1802 of some or all of the forecasting models used during the auto-forecasting stage, along with data about each of those forecasting models such as their details, type, and mean absolute percentage error (MAPE). The IM window 1800 may also include a graph 1804 showing the original time-series data 1806 and forecasting result 1808 from a selected forecasting model. In some examples, the user 1412 can select an option in the IM window 1800 to create their own custom model. An example of this is shown in FIG. 19.

Figure 19:
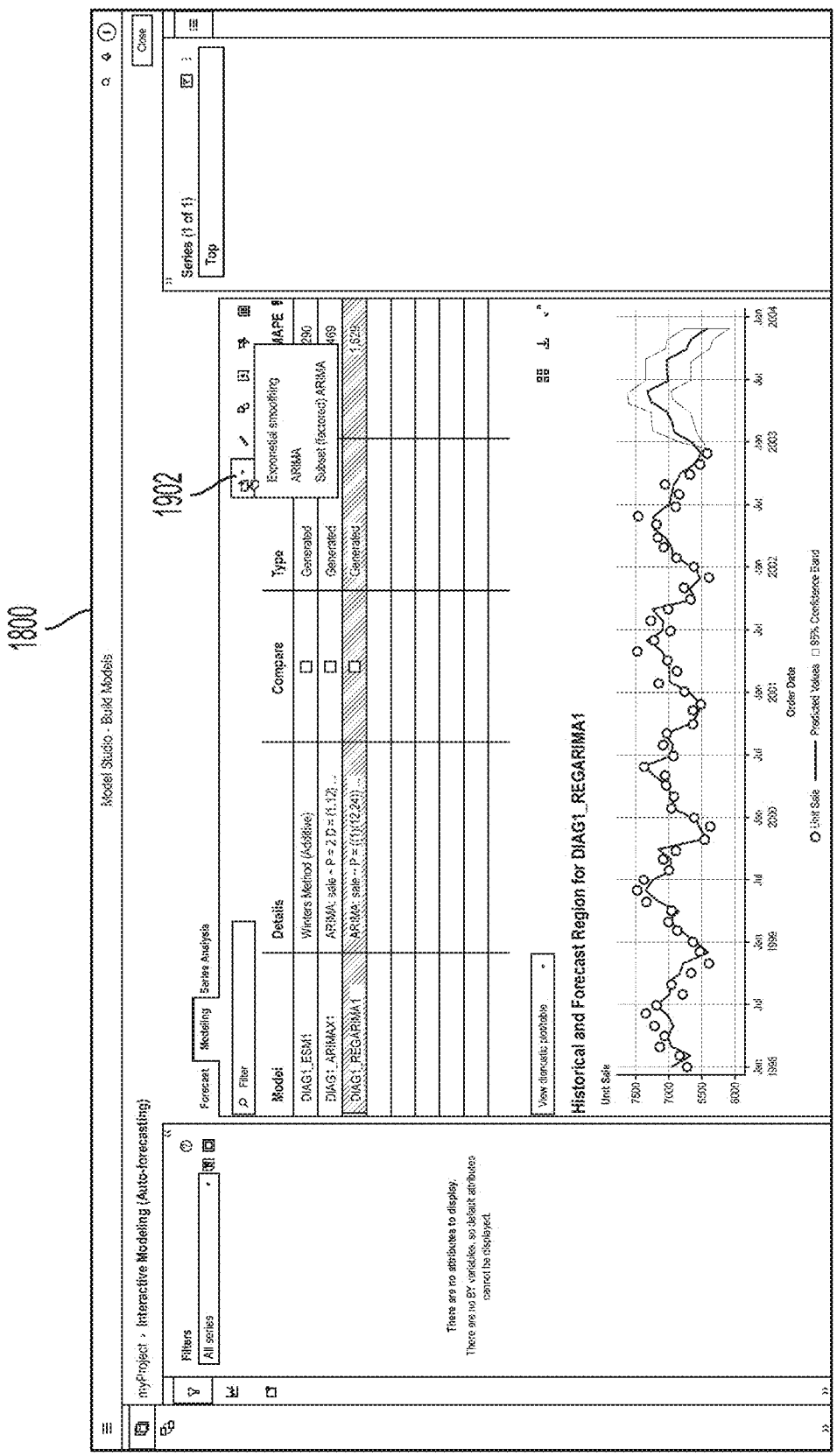
FIG. 19 shows an example of a GUI that includes a list of types of forecasting models according to some aspects of the present disclosure.

Referring now to FIG. 19, the user 1412 may select a button 1902 to access a list (e.g., menu) of available types of models that the user 1412 can customize. In this example, there are three available types of models—an exponential smoothing model, an ARIMA model, and a subset (factored) ARIMA model. But other examples may involve more, fewer, or different types of models than are shown in FIG. 19. The types of models that are available on this list may be dynamically determined based on the statistical information derived from the original time-series data during the data processing stage of the pipeline. Thus, this list of model types may change depending on the time series data under investigation. The user 1412 can select one of the options on the list to begin constructing a custom version of the selected type of model.

Figure 20:
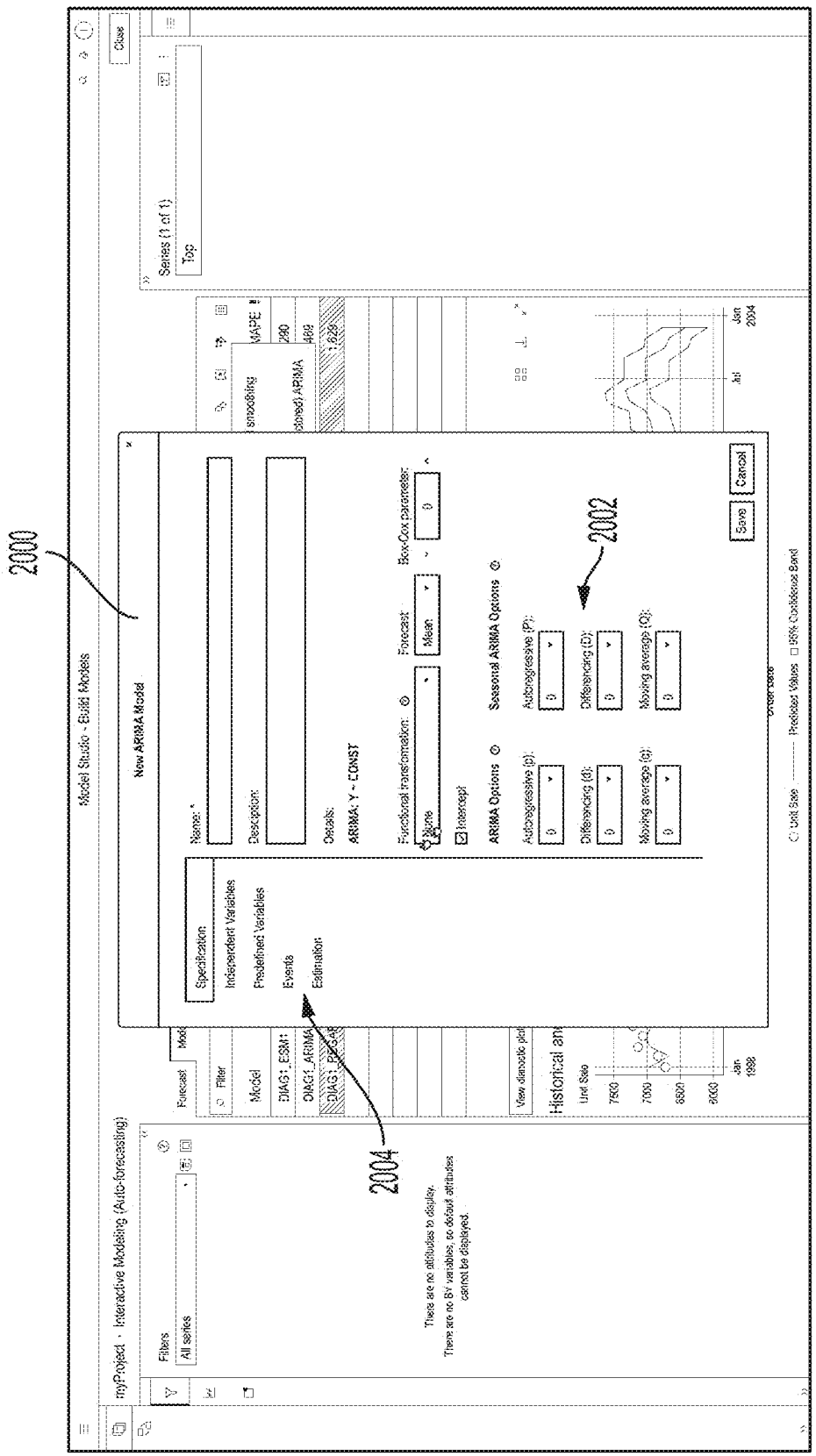
FIG. 20 shows an example of a GUI that includes graphical elements for inputting values for parameters of a custom forecasting model according to some aspects of the present disclosure.

After selecting one of the options on the list, the user 1412 may be presented with a customization window 2000, as shown in FIG. 20. In this example, the user 1412 has chosen to construct a new ARIMA model. The customization window 2000 can include graphical elements (e.g., text fields) through which the user 1412 can input a name and description for the new model. The customization window 2000 may also include one or more graphical elements 2002 (e.g., dropdown menus) through which the user 1412 can customize one or more parameters for the new model. In this example, the user 1412 can customize the functional transformation, autoregressive p value, seasonal autoregressive P value, differencing d value, seasonal differencing D value, moving average q value, and seasonal moving average Q value. The customization window 2000 may also include other selectable categories 2004 through which the user 1412 can customize other parameters associated with the model.

Figure 21:
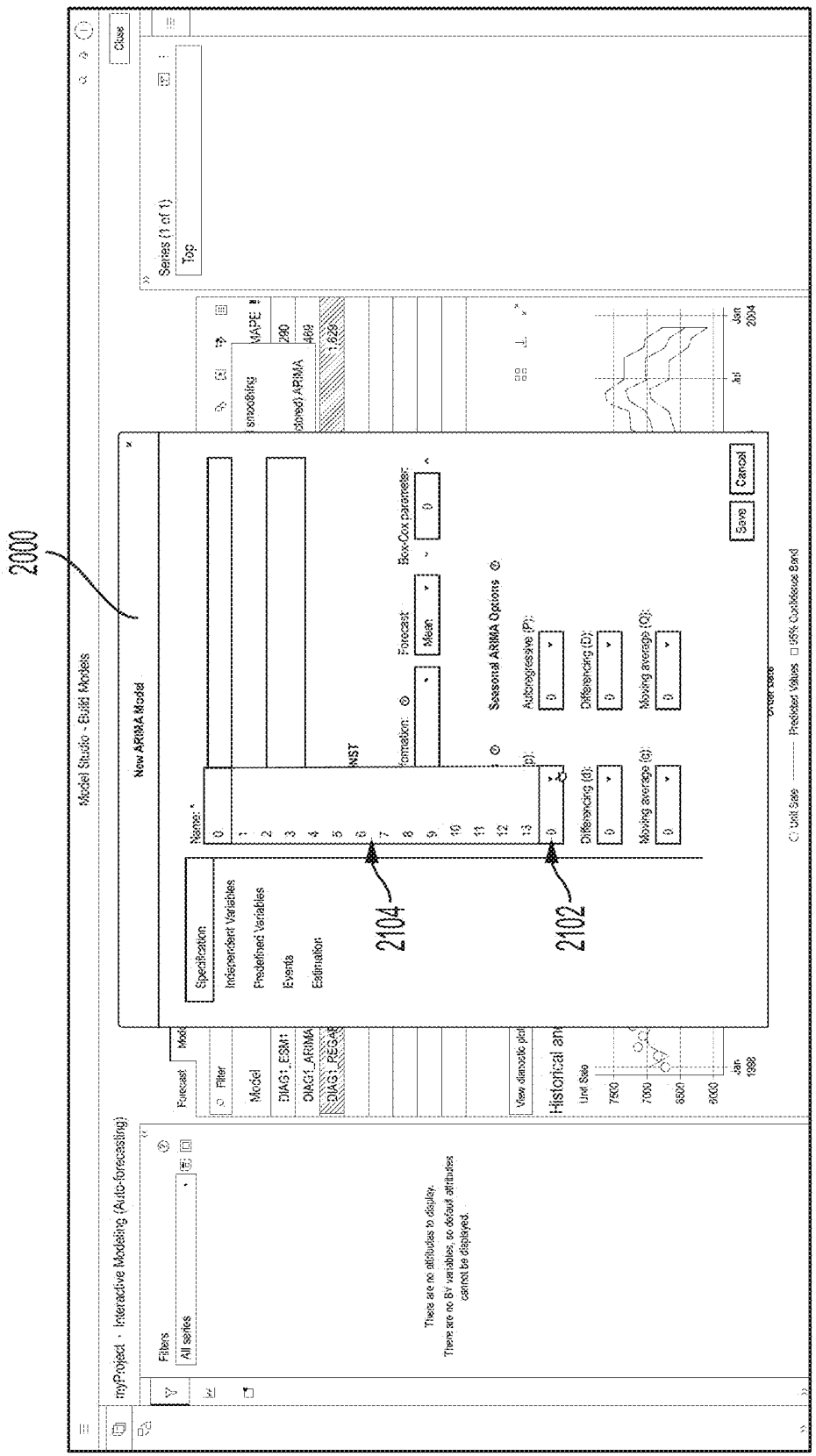
FIG. 21 shows an example of a user selecting a value for a parameter of a custom forecasting model according to some aspects of the present disclosure.
Figure 22:
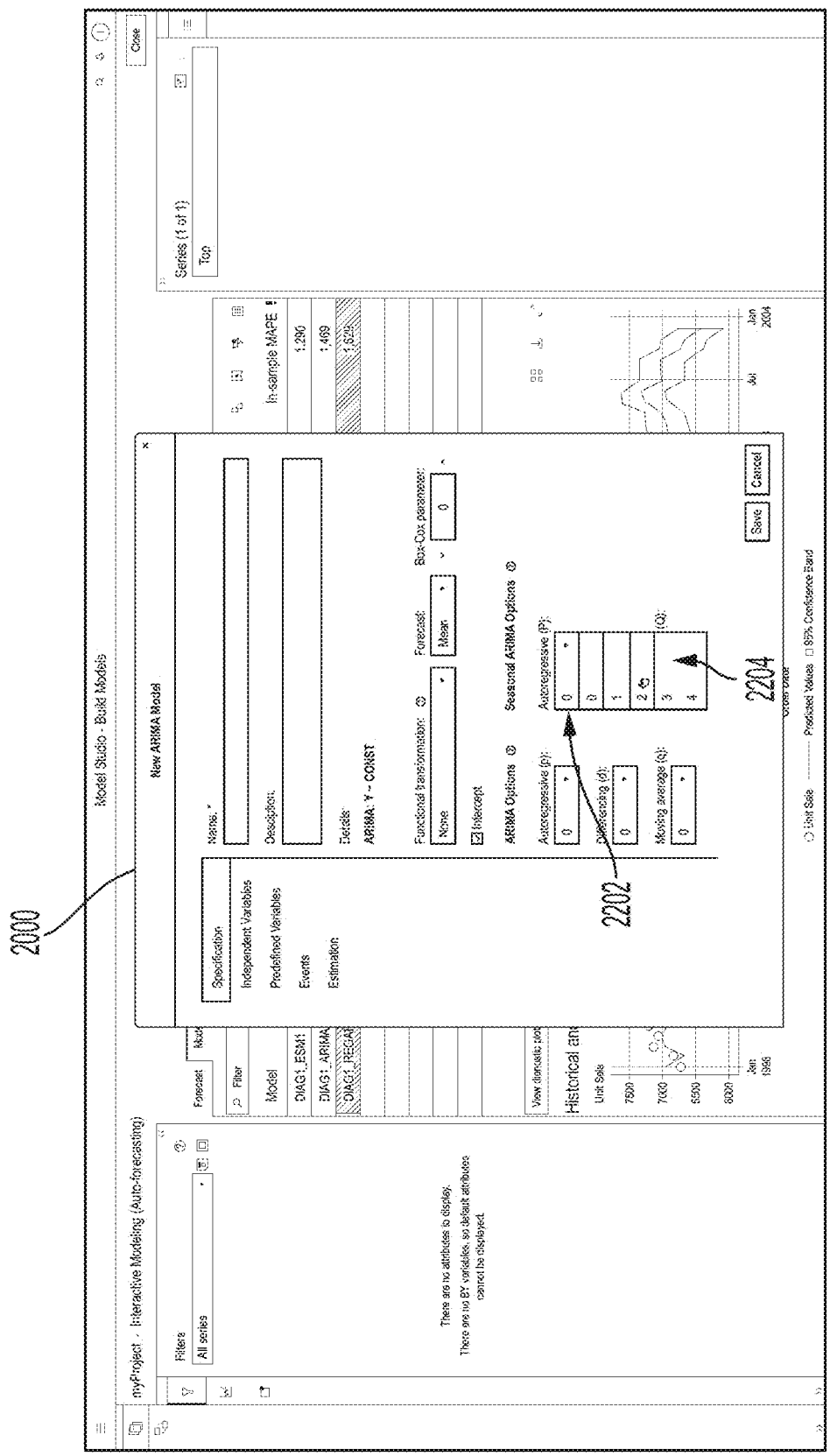
FIG. 22 shows an example of a user selecting another value for another parameter of a custom forecasting model according to some aspects of the present disclosure.

In some examples, the system 1400 can dynamically determine which values to present in each of the graphical elements 2002 based on the statistical information derived from the original time-series data. For example, as shown in FIG. 21, the user 1412 may access a menu 2102 that is populated with values 2104 dynamically chosen by the system 1400. In this example, the values 2104 range from 0 to 13. This range was dynamically determined by the system 1400 based on the statistical information derived from the original time-series data. The values 2104 may additionally or alternatively be determined based on other factors, such as the particular type of forecasting model that is being constructed. Another example is shown in FIG. 22, in which the user 1412 has selected a menu 2202 that is populated with values 2204 dynamically chosen by the system 1400, for example based on the statistical information derived from the original time-series data. By dynamically determining which values to present in each of the menus, the system 1400 can help guide the user 1412 into choosing valid values for the customizable parameters.

Figure 23:
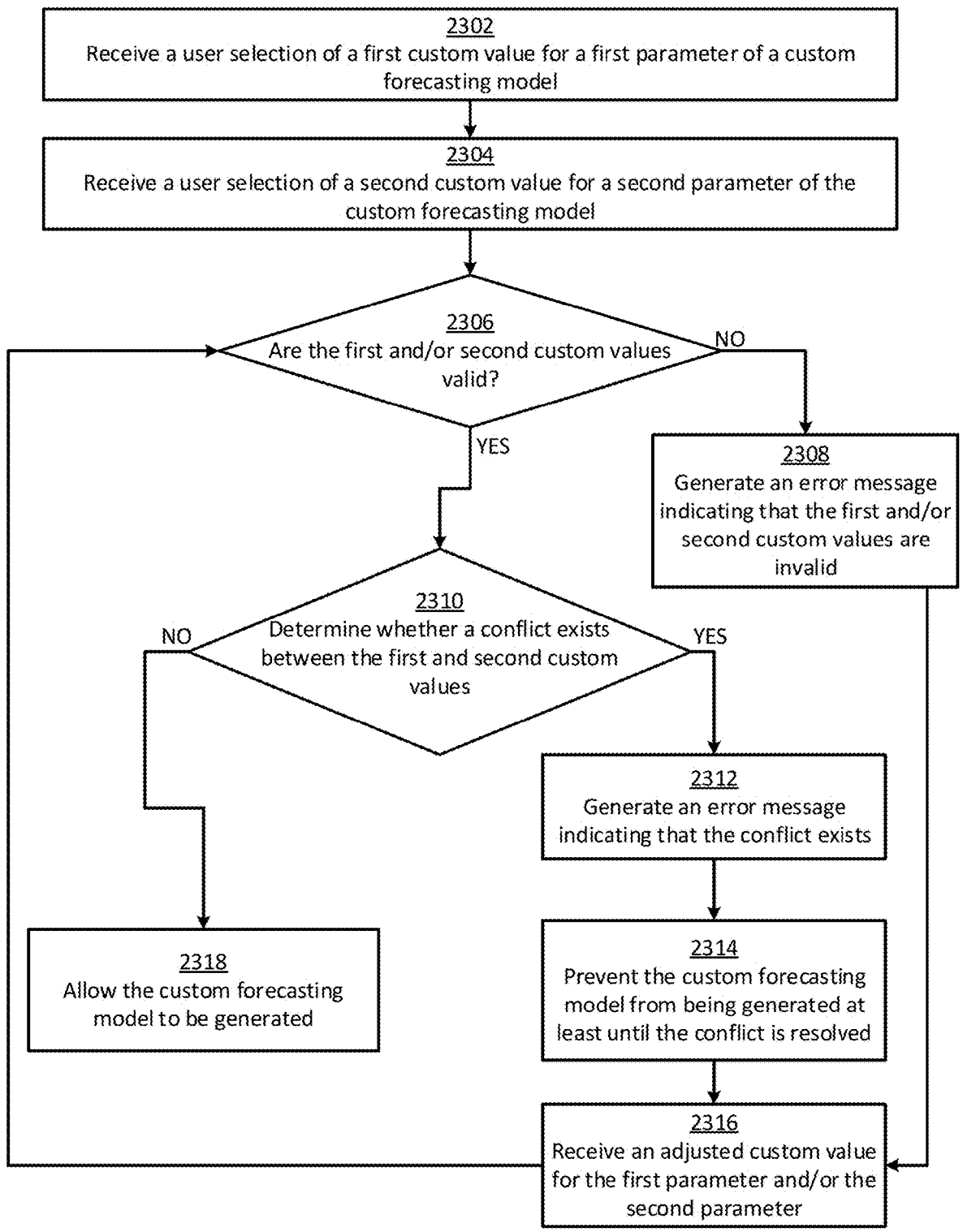
FIG. 23 shows a flowchart of an example of a process for validating user-selected values for parameters of a custom forecasting model according to some aspects of the present disclosure.

After the user 1412 selects values for the customizable parameters of the forecasting model, the system 1400 may validate the selected values. This validation may occur prior to constructing the custom forecasting model, for example to help ensure that the custom model will properly function. One example of a process for validating the values selected by the user 1412 is shown in FIG. 23. The process of FIG. 23 is described below with respect to the components of FIG. 14 for simplicity, but it will be appreciated that the process can be applied using any of the systems and techniques described above with respect to FIGS. 1-13.

In block 2302, the forecasting software receives a user selection of a first value for a first parameter of the forecasting model. For example, the user 1412 can select the first value from among a first list of candidate values associated with the first parameter. In the example shown in FIG. 21, the first value may be selected from the menu 2102 of values 2104.

In block 2304, the forecasting software receives a user selection of a second value for a second parameter of the forecasting model. For example, the user 1412 can select the second value from among a second list of candidate values associated with the second parameter. In the example shown in FIG. 22, the second value may be selected from the menu 2202 of values 2204.

In block 2306, the forecasting software determines whether the first value is valid, the second value is valid, or both. For example, the system 1400 can apply a rules engine 1414 to validate each individual value.

If either or both of the values are invalid, the process can proceed to block 2308 where the forecasting software can generate an error message indicating that the value(s) are invalid. For example, the server system 1404 can perform the validation process and, if a value is invalid, transmit an error notification to the client device 1402. The client device 1402 can receive the error notification and responsively output an error message in the GUI 1410. The error message can indicate to the user 1412 that they selected an invalid value.

If both of the values are valid, the process can proceed to block 2310 where the forecasting software can determine whether a conflict exists between the first and second values. For example, the system 1400 can apply a set of conflict rules using the rules engine 1414 to determine whether a conflict exists between the two values. If a conflict does not exist between the two values, then the process can proceed to block 2318 where the forecasting software can allow the custom forecasting model to be generated. For example, the server system 1404 can perform the validation process and, if the two values do not conflict with one another, transmit an approval notification to the client device 1402. The client device 1402 can receive the approval notification and responsively enable a button, that may have previously been disabled, to allow the user 1412 to generate the custom forecasting model.

Since a conflict can produce an operational problem with respect to the custom forecasting model, if a conflict exists between the two values, the process can proceed to block 2312 where the forecasting software can generate an error message indicating that the values conflict. For example, the server system 1404 can perform the validation process and, if the two values conflict with one another, transmit a conflict notification to the client device 1402. The client device 1402 can receive the conflict notification and responsively output an error message in the GUI 1410. The error message can indicate to the user 1412 that they selected conflicting values.

In block 2314, the forecasting software prevents the custom forecasting model from being generated at least until the conflict is resolved. For example, the forecasting software may ignore commands from the client device 1402 to generate the custom forecasting model and/or disable a button that is normally selectable to generate the custom forecasting model.

In some examples, the user 1412 may view the error message and adjust one or both of the values to help resolve any conflicts or validation errors. If the user 1412 does so, then the process can continue to block 2316. At block 2316, the forecasting software receives an adjusted value for the first parameter, the second parameter, or both. For example, the user 1412 can select a new value from among the first list of candidate values associated with the first parameter. The user 1412 may also select a new value from among the second list of candidate values associated with the second parameter. The process can then return to block 2306, where the new values can be validated and the rest of the process can repeat. If the new values are valid, the server system 1404 may transmit an approval notification to the client device 1402, which can allow the custom forecasting model to be generated in response to receiving the approval notification.

Figure 24:
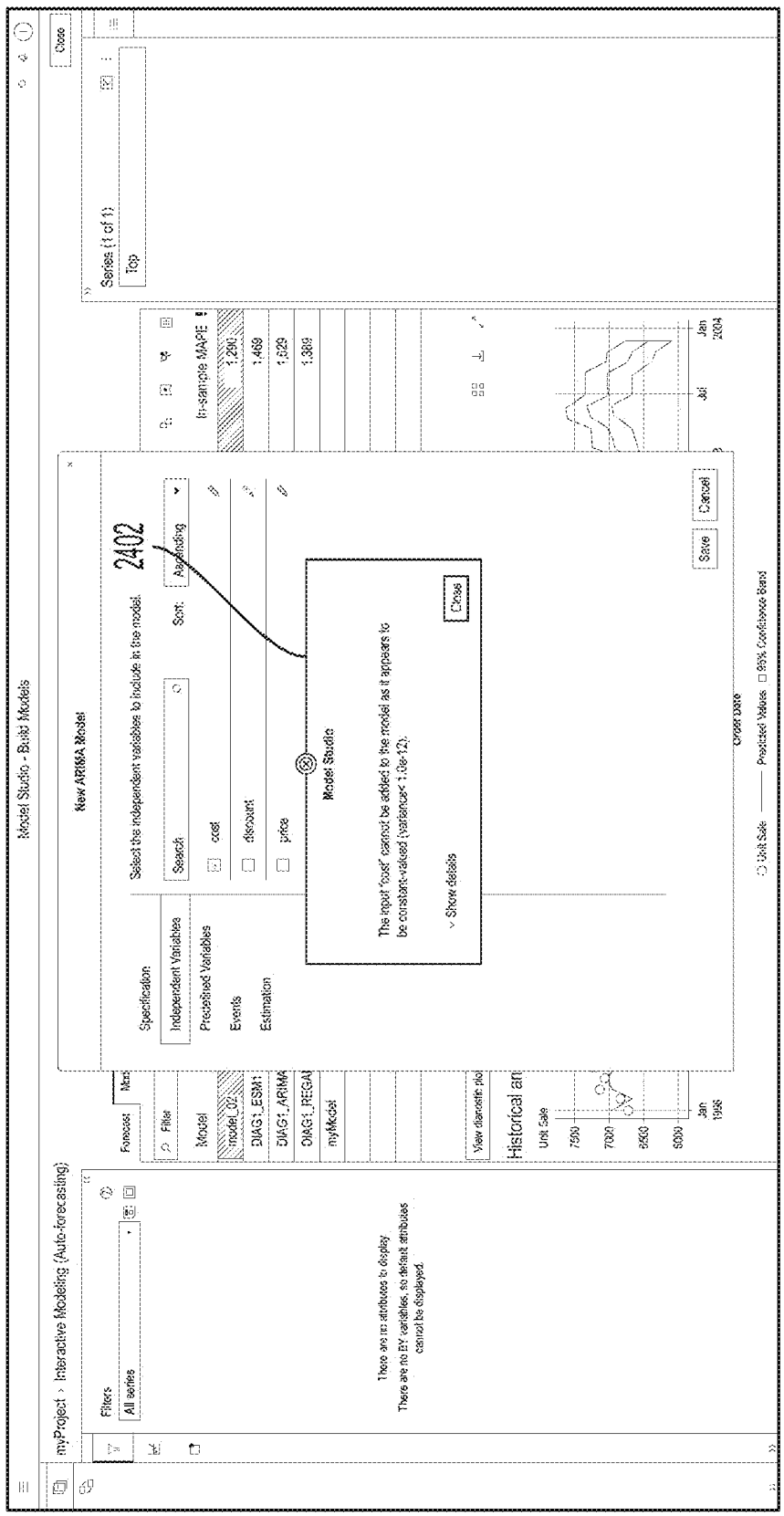
FIGS. 24-26 show examples of error messages indicating problems associated with user-selected values for parameters of a custom forecasting model according to some aspects of the present disclosure.
Figure 25:
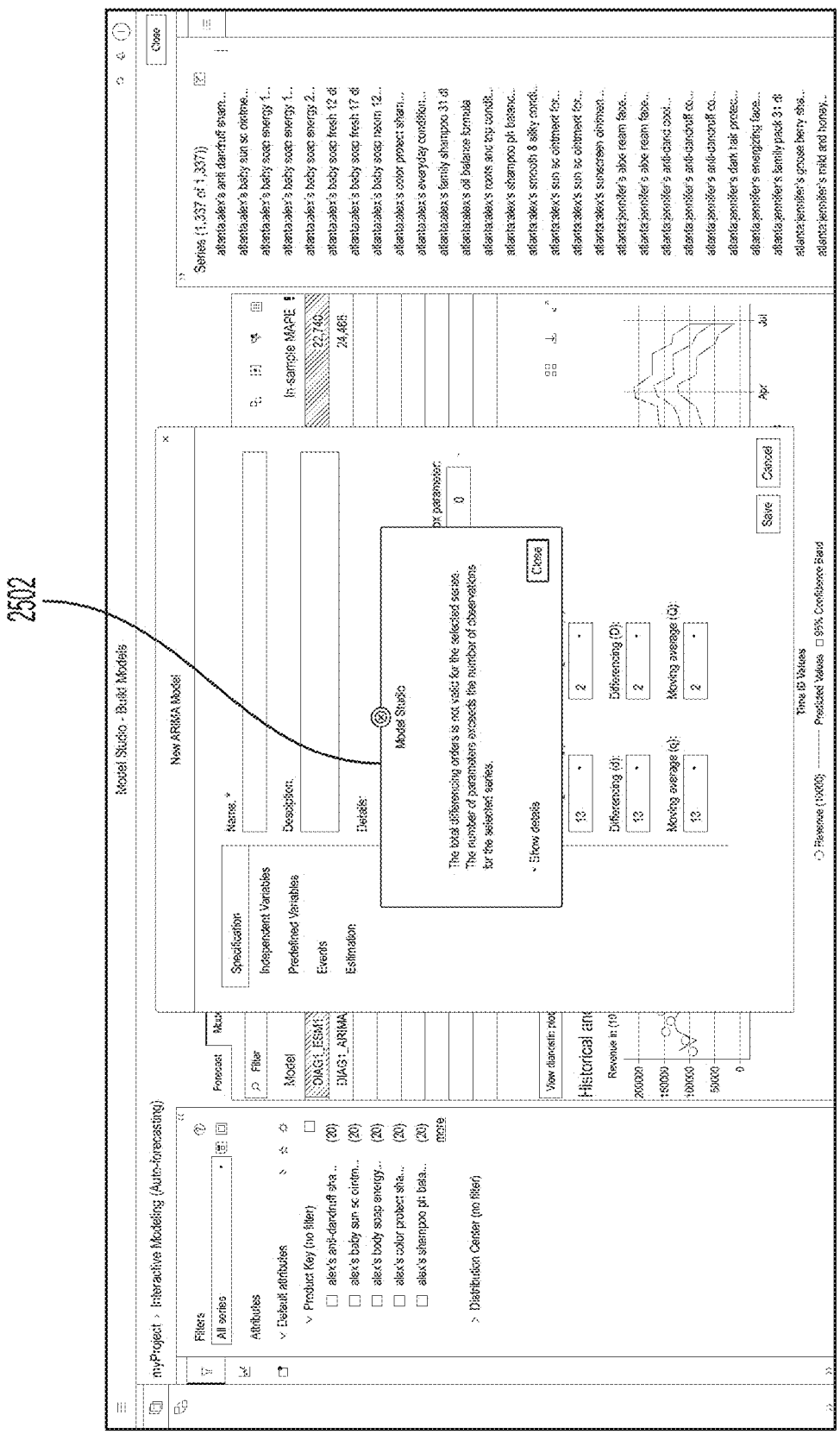
Figure 26:
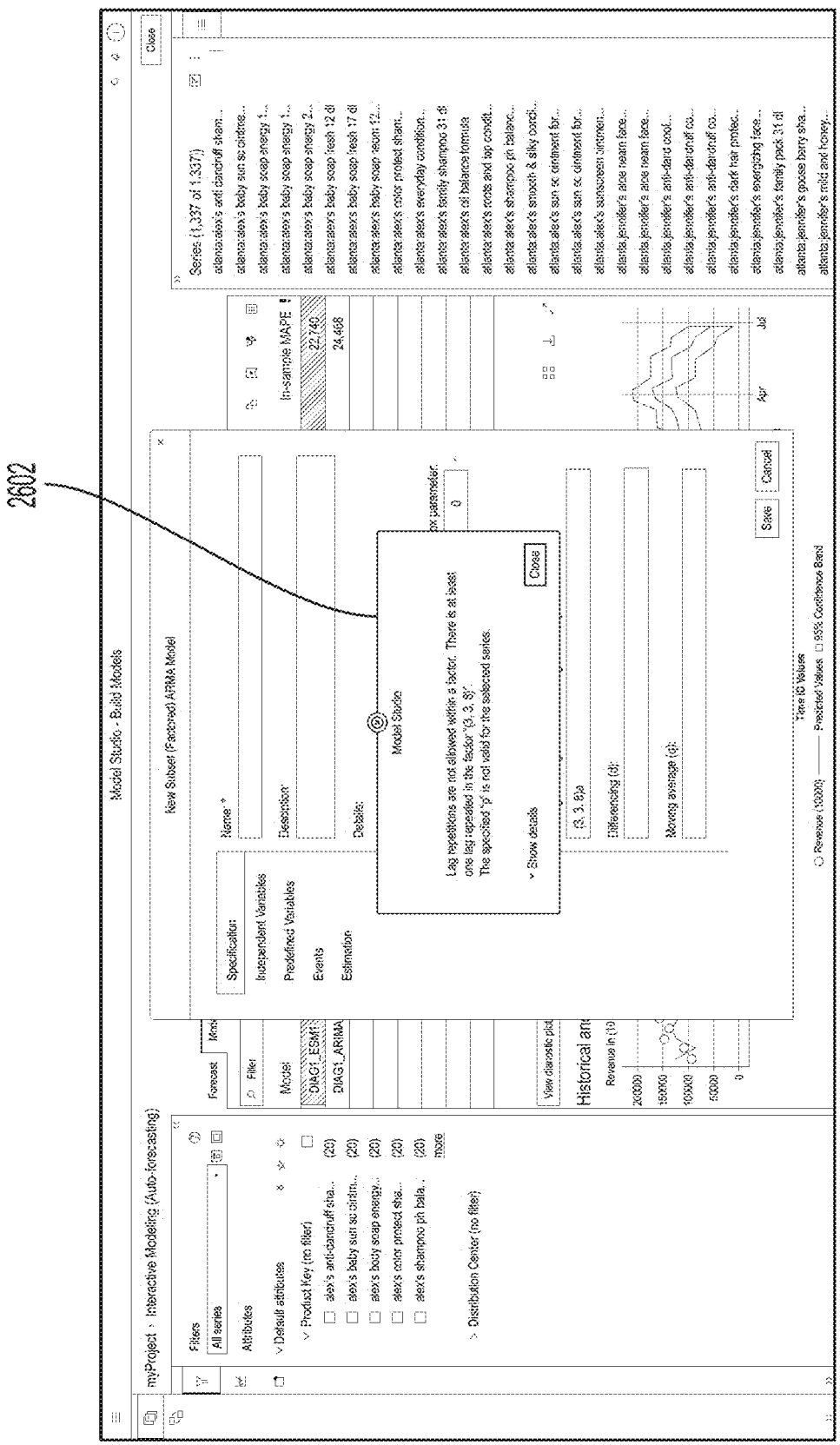

Some examples of the error messages described above are shown in FIGS. 24-26. FIG. 24 shows an example of an error message 2402 triggered as a result of the user 1412 selecting an invalid type of independent variable for the custom forecasting model. FIG. 25 shows an example of an error message 2502 triggered as a result of two problems—the user 1412 selecting invalid differencing orders and the user 1412 selecting values that lead to an invalid number of model parameters. In this example, the number of parameters is invalid because it exceeds the number of observations in the selected time series data. FIG. 26 shows an example of an error message 2602 triggered as a result of the user 1412 inputting a lag repetition into an input field for a parameter that does not allow lag repetitions. The error message 2602 also indicates that the user 1412 selected an invalid autoregressive "p" value. In other examples, the system 1400 may detect other kinds of errors and display them in one or more error messages to the user 1412.

Figure 27:
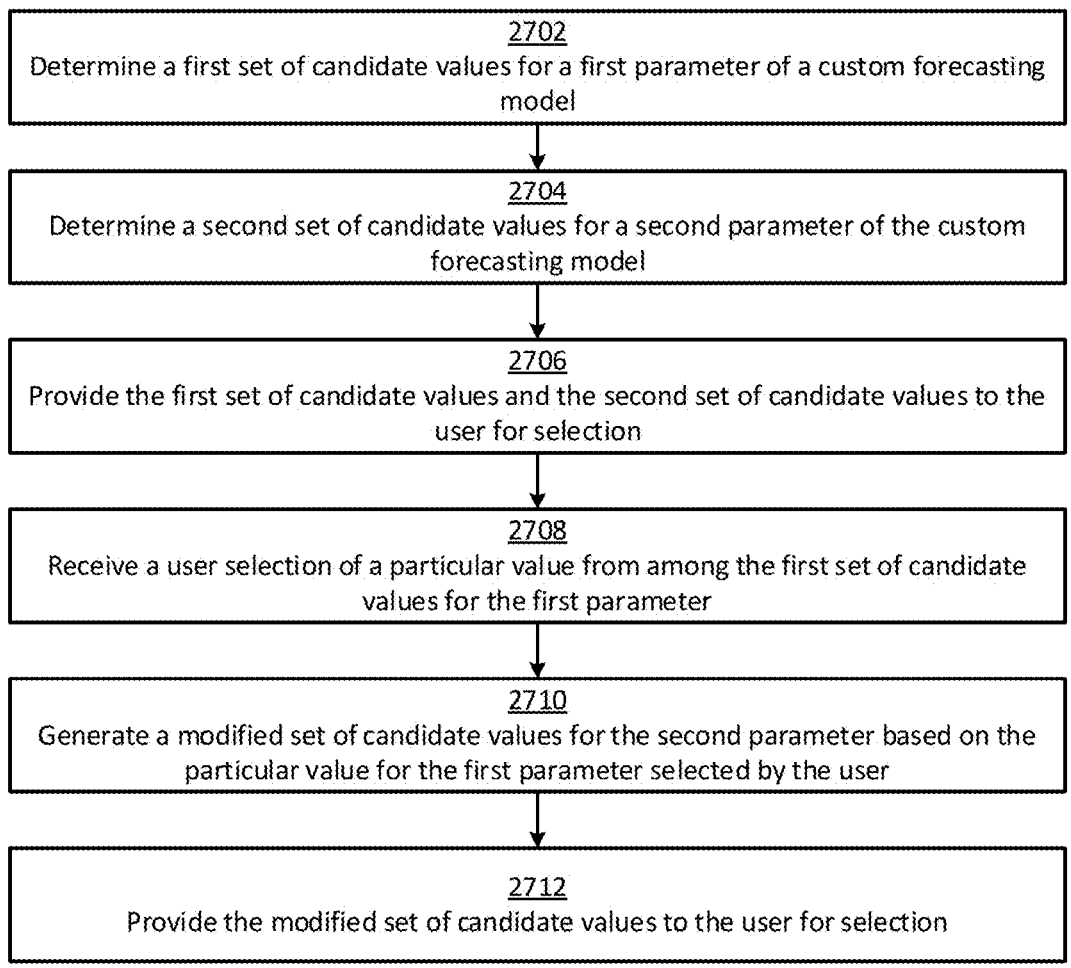
FIG. 27 shows a flowchart of an example of a process for dynamically updating a set of candidate values for a second parameter of a custom forecasting model based on a user-selected value for a first parameter of the custom forecasting model according to some aspects of the present disclosure.

As noted above, the GUI 1410 can include a first graphical element with a first set of candidate values for a first parameter of a custom forecasting model. The GUI 1410 can also include a second graphical element with a second set of candidate values for a second parameter of the custom forecasting model. In some examples, if the user 1412 selects a value from the first set of candidate values, the system 1400 may dynamically update the second set of candidate values based on the user's selection. This dynamic filtering of the second set of candidate values, based on the value selected by the user 1412 for the first parameter, can help prevent conflicts and other problems. One examples of this process is described in greater detail below with respect to FIG. 27. The process of FIG. 27 is described below with respect to the components of FIG. 14 for simplicity, but it will be appreciated that the process can be applied using any of the systems and techniques described above with respect to FIGS. 1-13.

In block 2702, the forecasting software determines a first set of candidate values for a first parameter of a custom forecasting model. The forecasting software can determine the first set of candidate values for the first parameter using any of the techniques described above, such as the techniques described with respect to block 1514 of FIG. 15.

In block 2704, the forecasting software determines a second set of candidate values for a second parameter of the custom forecasting model. The forecasting software can determine the second set of candidate values for the second parameter using any of the techniques described above, such as the techniques described with respect to block 1514 of FIG. 15.

In block 2706, the forecasting software provides the first set of candidate values and the second set of candidate values to the user 1412 for selection. The forecasting software can perform this operation using any of the techniques described above, such as the techniques described with respect to block 1516 of FIG. 15.

In block 2708, the forecasting software receives a user selection of a particular value from among the first set of candidate values for the first parameter. The forecasting software can perform this operation using any of the techniques described above, such as the techniques described with respect to block 2302 of FIG. 23.

In block 2710, the forecasting software generates a modified set of candidate values for the second parameter based on the particular value for the first parameter selected by the user 1412. For example, the forecasting software can add candidate values to, or remove candidate values from, the second set of candidate values to generate the modified set of candidate values. In some examples, the forecasting software can determine how to modify the second set of candidate values by applying a rules engine 1414. For example, the forecasting software can apply the rules engine 1414 to determine which existing values in the second set of candidate values would conflict with the particular value for the first parameter selected by the user 1412. The forecasting software can then remove the conflicting values from the second set of candidate values to generate the modified set of candidate values.

In block 2712, the forecasting software provides the modified set of candidate values to the user 1412 for selection. The forecasting software can perform this operation using any of the techniques described above, such as the techniques described with respect to block 1516 of FIG. 15.

FIGS. 28-33 shows examples of various pre- and post-validation processes that can be applied according to some aspects described herein. Each of these figures will now be described in turn. It will be appreciated that these flowcharts are intended to be illustrative and non-limiting. Other examples may involve more operations, fewer operations, different operations, or different sequences of operations than are shown in these figures.

Figure 28A:
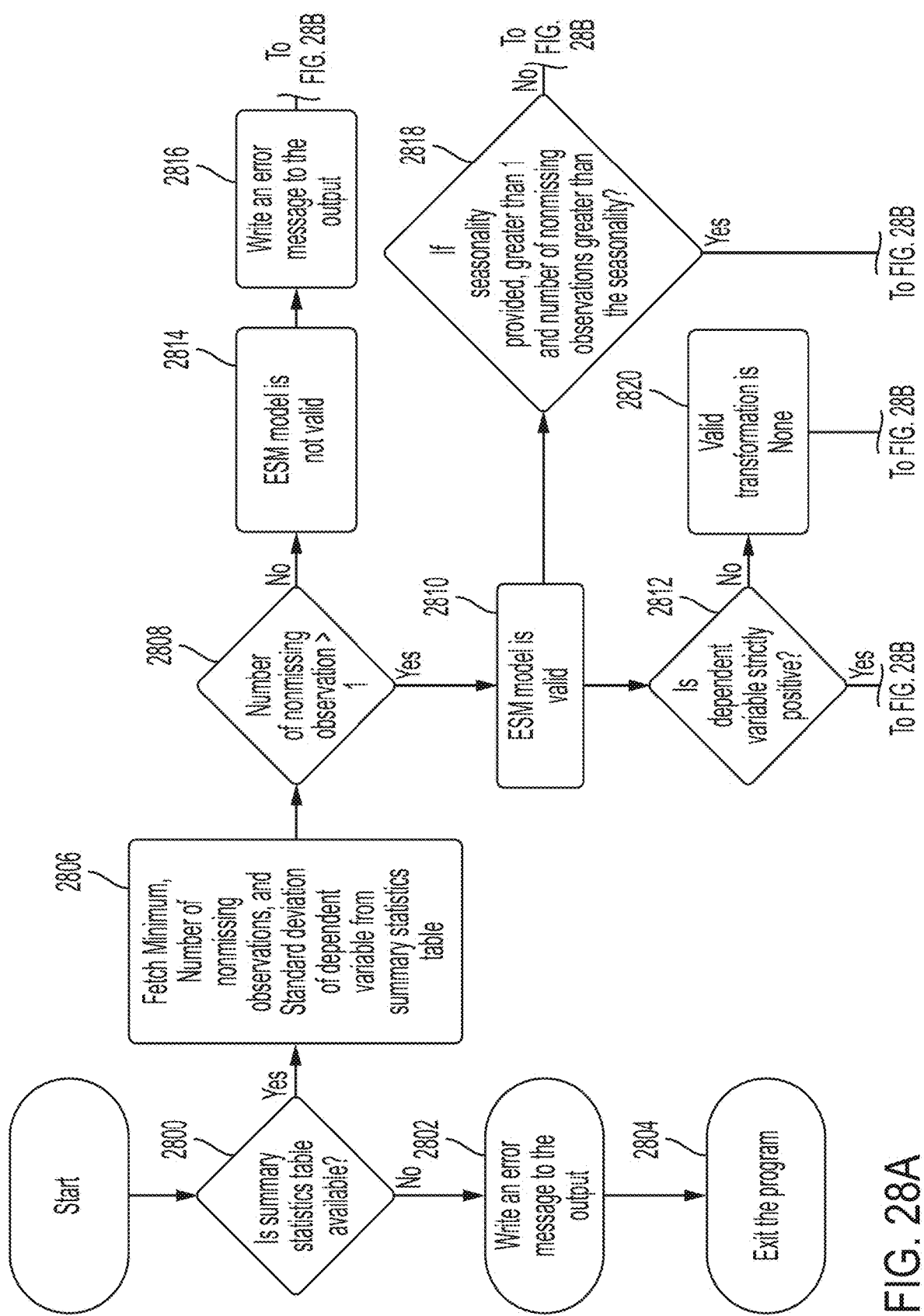
FIGS. 28A-C show flowcharts of examples of pre-validation and post-validation processes associated with applying an ESM model to selected time series data according to some aspects of the present disclosure.
Figure 28B:
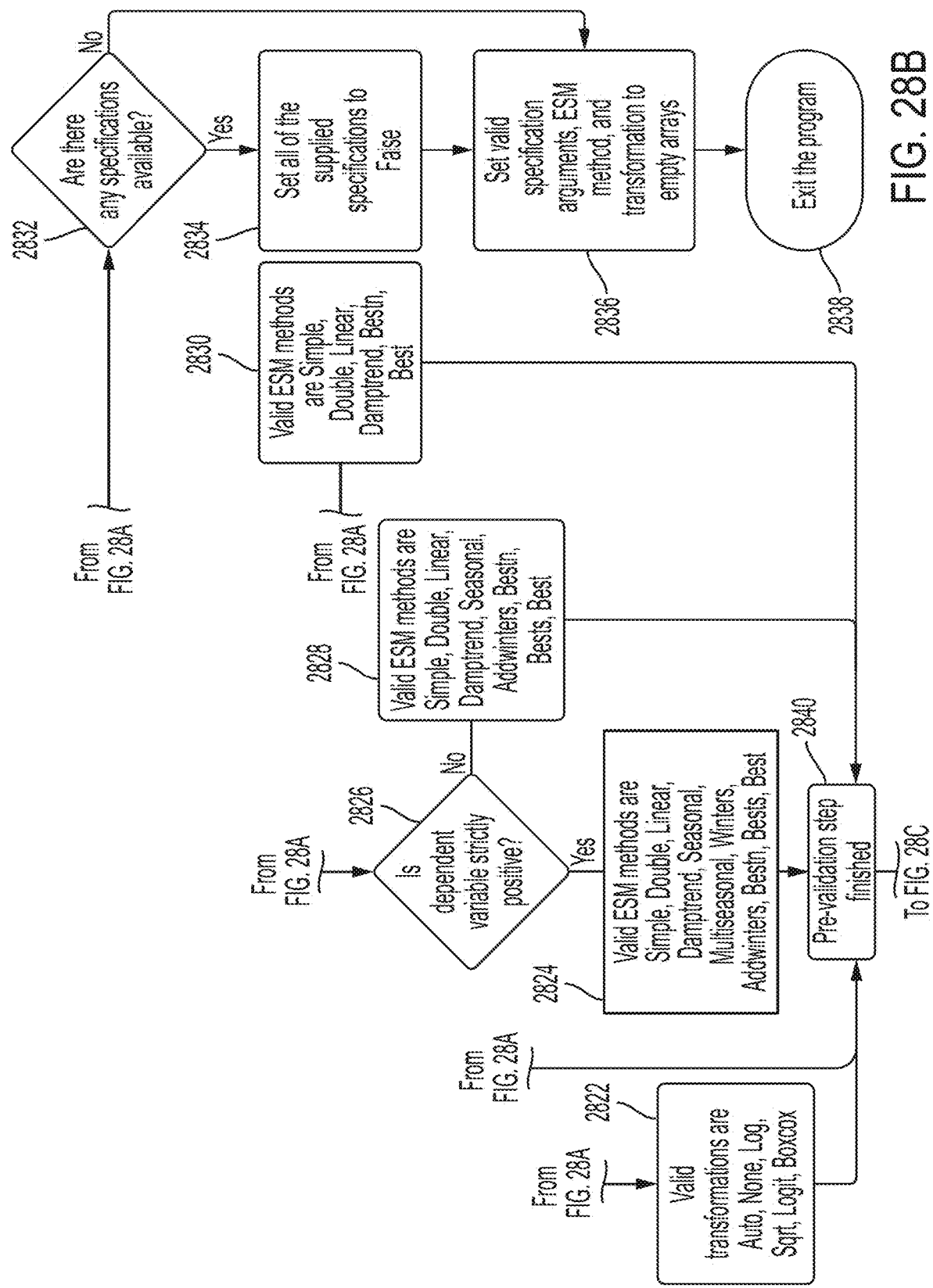
Figure 28C:
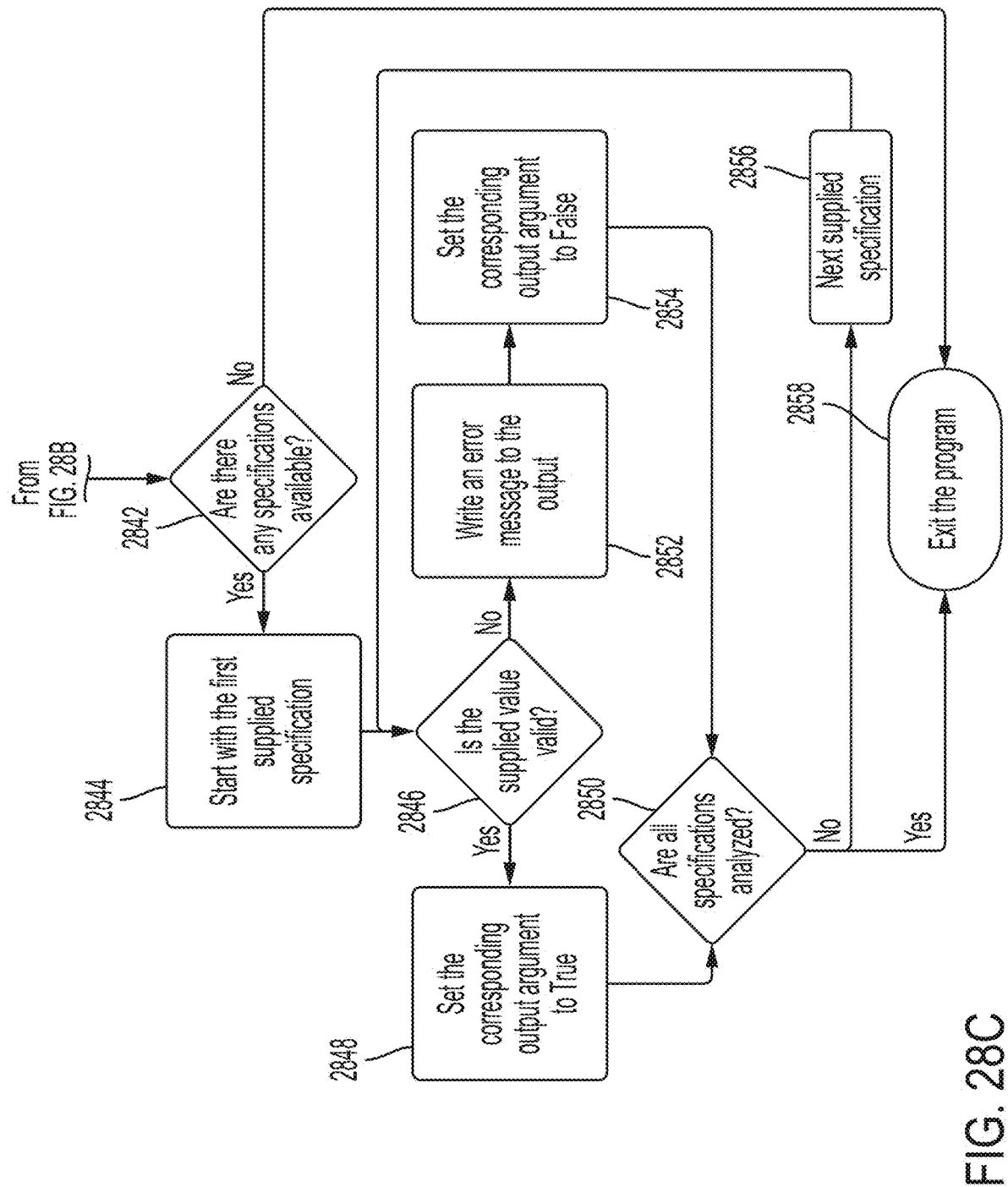

Referring now to FIGS. 28A-C, shown are flowcharts of examples of pre-validation and validation processes for exponential smoothing models (ESMs) according to some aspects of the present disclosure. In particular, FIGS. 28A-B show an example of a pre-validation process and FIG. 28C shows an example of a post-validation process. The pre-validation process begins at step 2800 of FIG. 28A, where the forecasting software determines if a summary statistics table is available. A summary statistics table is a table of statistical information generated about a dataset. The statistical information can be generated as described above with respect to block 1504 of FIG. 15. If a summary statistics table is not available, the pre-validation process can proceed to block 2802 where the forecasting software can write an error message to the output and then exit at block 2804. If the summary statistics table is available, the pre-validation process can continue to block 2806 where the forecasting software can gather certain information from the summary statistics table, such as the minimum number of available (e.g., non-missing) observations and standard deviation of the dependent variable.

At block 2808, the forecasting software can determine whether the number of non-missing observations is greater than one. If not, the forecasting software can determine that the ESM model is invalid at block 2814, write an error message to the output at block 2816, and continue with the process shown in FIG. 28B. Referring now to FIG. 28, the pre-validation process can continue at block 2832 where the forecasting software can determine if there are any specifications available. If so, the pre-validation process can proceed to block 2834 where all of the supplied specifications are set to false. At block 2836, the forecasting software can set the valid specification arguments, ESM method, and transformation to empty arrays. The pre-validation process can terminate at block 2838.

Referring back to block 2808 of FIG. 28A, if the forecasting software determines that the number of non-missing observations is greater than or equal to one, then the forecasting software can determine that the ESM model is valid at block 2810. At this point, the pre-validation process can branch into two directions. In one direction, the pre-validation process can proceed to block 2818. In the other direction, the pre-validation process can proceed to block 1812.

At block 2818, the forecasting software can determine whether the seasonality of the time interval is greater than one, assuming there is seasonality in the dataset, and whether the number of available observations is greater than the seasonality. If not, the pre-validation process can continue to block 2830 of FIG. 28B, where the forecasting software can determine that the valid ESM methods are simple, double, linear, damp-trend, bestn, and best. The pre-validation process can then proceed to block 2840, where it is finished. Returning to block 2818, if the forecasting software determines that the conditions are satisfied, the pre-validation process can continue to block 2826 of FIG. 28B. At block 2826, the forecasting software can determine if the dependent variable is strictly positive. If not, the forecasting software can determine that the valid ESM methods are simple, double, linear, damp-trend, addwinters, bestn, bests, and best. The pre-validation process can then proceed to block 2840, where it is finished. If the dependent variable is determined to be strictly positive at block 2826, then the pre-validation process can continue to block 2824, where the forecasting software can determine that the valid ESM methods are simple, double, linear, damp-trend, seasonal, multiseasonal, winters, addwinters, bestn, bests, and best. The pre-validation process can then proceed to block 2840, where it is finished.

Returning to FIG. 28A, at block 2812, the forecasting software can determine whether the dependent variable is strictly positive. If so, the pre-validation process can continue to block 2822 of FIG. 28B, where the forecasting software can determine that the valid transformations are auto, none, log, sqrt, logit, and boxcox. Otherwise, the forecasting software can determine that there is not valid transformation at block 2820, and then continue to block 2840 of FIG. 28*b*, where the pre-validation process is finished.

After the pre-validation process is complete, the forecasting software can initiate the validation process shown in FIG. 28C. Referring now to FIG. 28C, the forecasting software can determine if there are any specifications available for the model. If not, the process can exit at block 2858. If so, the validation process can continue to block 2844 where the forecasting software can start with the first supplied specification and analyze it. In block 2846, the forecasting software can determine whether the supplied value is valid. If the supplied value is valid, the forecasting software can set the corresponding output argument to "true" at block 2848. If the supplied value is invalid, the forecasting software can write an error message to the output at block 2852 and set the corresponding output argument to "false" at block 2854. At block 2850, the forecasting software can determine if all specifications have been analyzed. If not, the process can proceed to block 2856 where the next supplied specification can be selected and the process can iterate for that specification. If all specifications have been analyzed, then the process can end at block 2858.

Figure 29A:
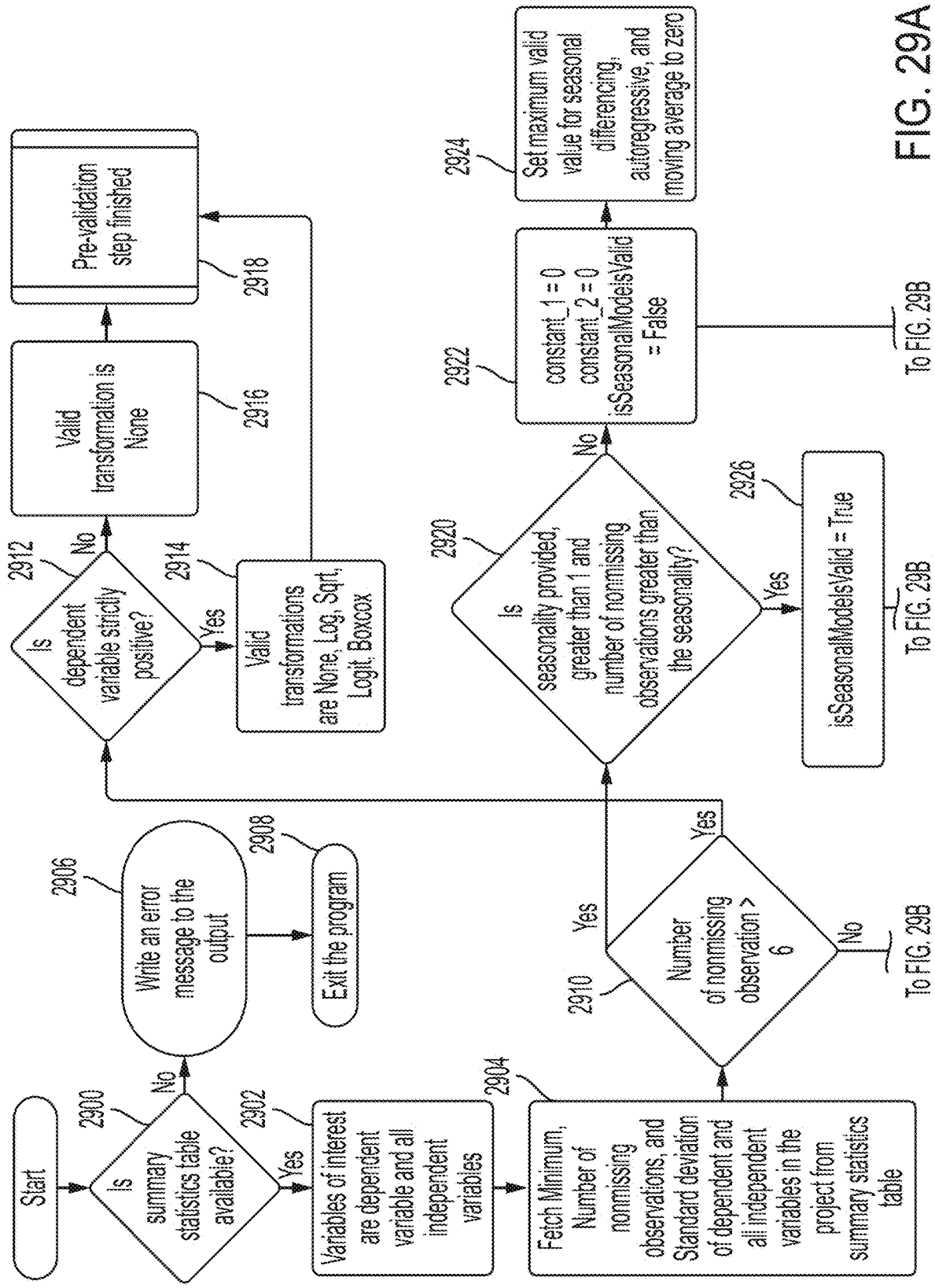
FIGS. 29A-B show flowcharts of examples of pre-validation processes associated with applying an ARIMA or a subset ARIMA model to selected time series data according to some aspects of the present disclosure.
Figure 29B:
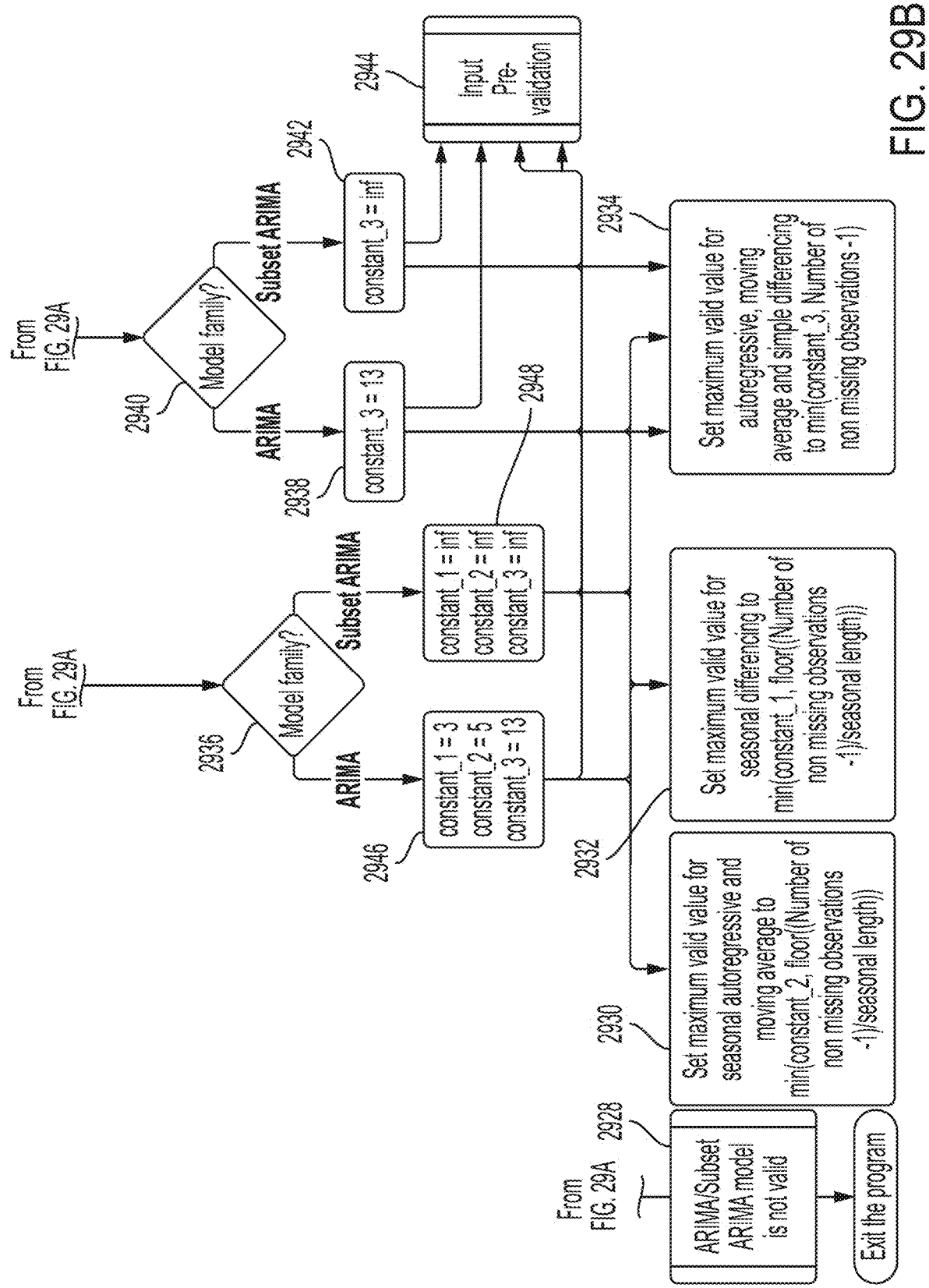

FIGS. 29A-B show an example of a process for pre-validating an ARIMA model or a subset ARIMA model according to some aspects of the present disclosure. The validation process may require the access to the summary statistics table to find required statistical information (e.g., the minimum, number of non-missing observations, and standard deviation). The validation process provides conditions to find valid transformations for the dependent variable and to know if seasonal models are valid or not. The validation process may also set a maximum valid value for simple and seasonal autoregressive orders, simple and seasonal moving average orders, simple and seasonal differencing order, and performs model input pre-validation.

Referring now to FIG. 29A, the pre-validation process begins at block 2900, where the forecasting software determines whether a summary statistics table is available for a dataset. If not, the forecasting software writes an error message to the output at block 2906 and ends at block 2908. If the summary statistics table is available, at block 2902, the forecasting software determines that the variables of interest are the dependent variable and all independent variables. At block 2904, the forecasting software obtains the minimum value, the number of non-missing observations, and the standard deviation of the dependent variable and all independent variables, from the summary statistics table. The pre-validation process can then continue to block 2910 where the forecasting software determines if the number of available observations is greater than six. If not, the pre-validation process can continue to block 2928 of FIG. 28B, where the forecasting software determines that the ARIMA model or the subset ARIMA model is invalid.

Referring back to FIG. 29A, if the forecasting software determines at block 2910 that the number of available observations is greater than six, then the pre-validation process can split into two branches. In the first branch, the pre-validation process can continue to block 2912, where the forecasting software determines if the dependent variable is strictly positive. If not, the forecasting software determines that there is no valid transformation at block 2916 and the pre-validation step is finished. On the other hand, if the forecasting software determines that the dependent variable is strictly positive at block 2912, then the forecasting software can determine that the valid transformations are none, log, sqrt, logit, and boxcox at block 2914. In the second branch (from block 2910), the pre-validation process can continue to block 2920, where the forecasting software can determine whether the seasonality of the time interval is greater than one, assuming there is seasonality in the dataset, and whether the number of available observations is greater than the seasonality. If so, the pre-validation process can continue to block 2927, where the forecasting software can set a variable to "true" and continue to block 2936 of FIG. 29B.

In block 2936 of FIG. 29B, the forecasting software can determine whether the selected type of model is an ARIMA model or a subset ARIMA model. If the selected type of model is an ARIMA model, the pre-validation process can continue to block 2946, where various constants can be set to numerical values. If the selected type of model is a subset ARIMA model, the pre-validation process can continue to block 2948, where various constants can be set to "inf" (e.g., infinity). The process may proceed to some or all of blocks 2930, 2932, and 2934, where the forecasting software can set the maximum valid value for the seasonal autoregressive and moving average to a certain value, the maximum valid value for seasonal differencing to a certain value, and the maximum value for autoregressive, moving average and simple differencing to a certain value, respectively.

Returning to block 2920 of FIG. 29A, if the depicted conditions are not satisfied, then the pre-validation process can continue to block 2922 and block 2924. In block 2922, the forecasting software can set various variable values. In block 2924, the forecasting software can set the maximum valid value for seasonal differencing, autoregressive, and moving average to zero. After block 2922, the pre-validation process can continue to block 2940 of FIG. 29B, where the forecasting software can determine whether the selected type of model is an ARIMA model or a subset ARIMA model. If the selected type of model is an ARIMA model, the pre-validation process can continue to block 2938 where a constant is set to a numerical value. If the selected type of model is a subset ARIMA model, the pre-validation process can continue to block 2942 where the constant can be set to "inf." The process may proceed to some or all of blocks 2930, 2932, and 2934.

Figure 30:
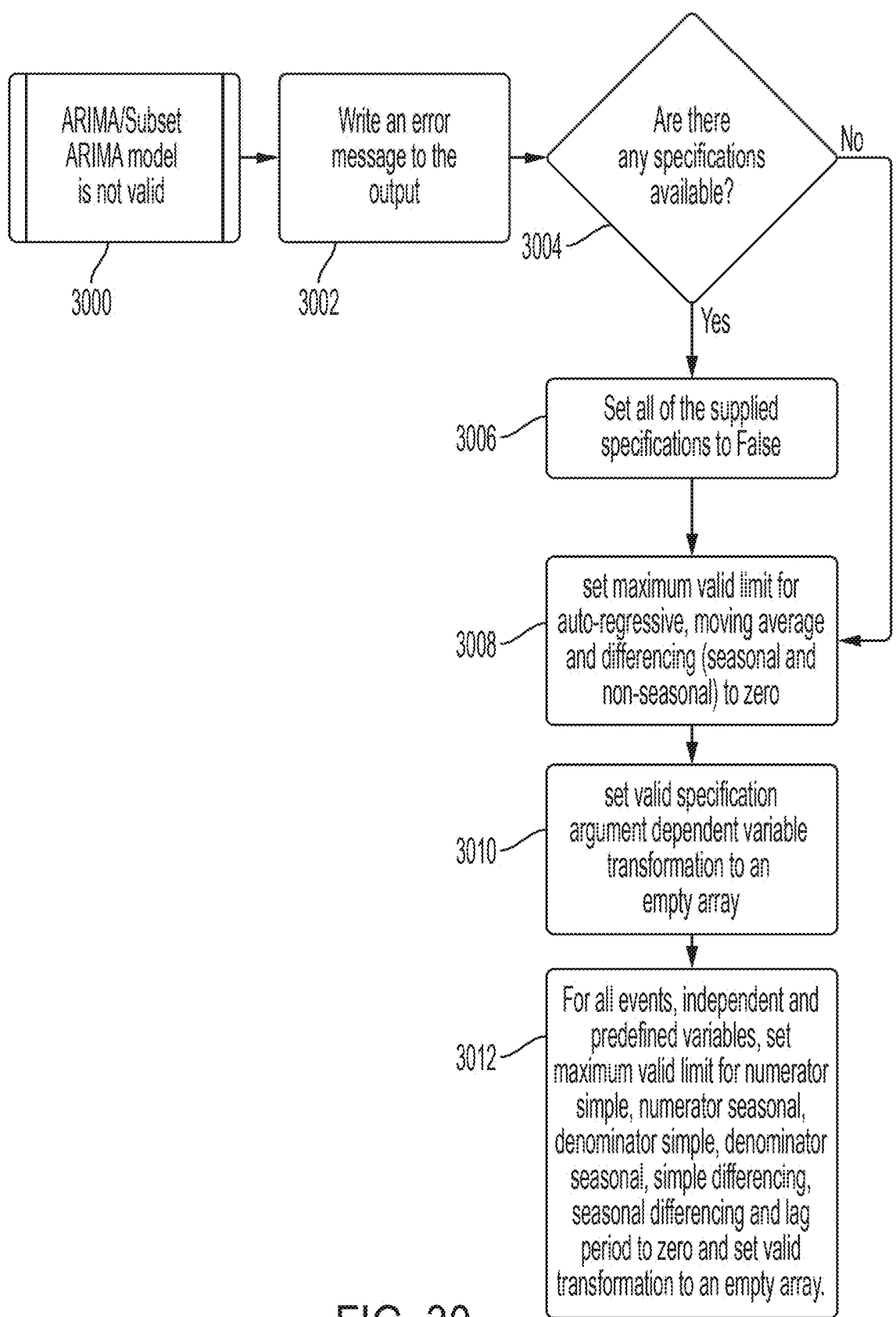
FIG. 30 shows a flowchart of an example of a process that can be applied when an ARIMA model or a Subset ARIMA model is determined to be invalid according to some aspects of the present disclosure.

FIG. 30 shows a flowchart of an example of a process that may be implemented when ARIMA or subset ARIMA model is invalid according to some aspects of the present disclosure. It shows the steps needed before exiting the program. In particular, in block 3002 the forecasting software writes an error message to the output. In block 3004, the forecasting software determines if there are any specifications available. If so, the forecasting software sets all of the supplied specifications to "false" at block 3006. In block 3008, the forecasting software sets maximum valid limits to zero for all numeric fields. In block 3010, the forecasting software sets valid transformations for applicable inputs and the dependent variable to empty arrays. Finally, in block 3012, the forecasting software can set various values for all events, independent variables and predefined variables. For example, the forecasting software can set the maximum valid limit for numerator simple, numerator seasonal, denominator simple, denominator seasonal, simple differencing, seasonal differencing, and lag to zero. The forecasting software can also set the valid transformation field to an empty array.

Figure 31:
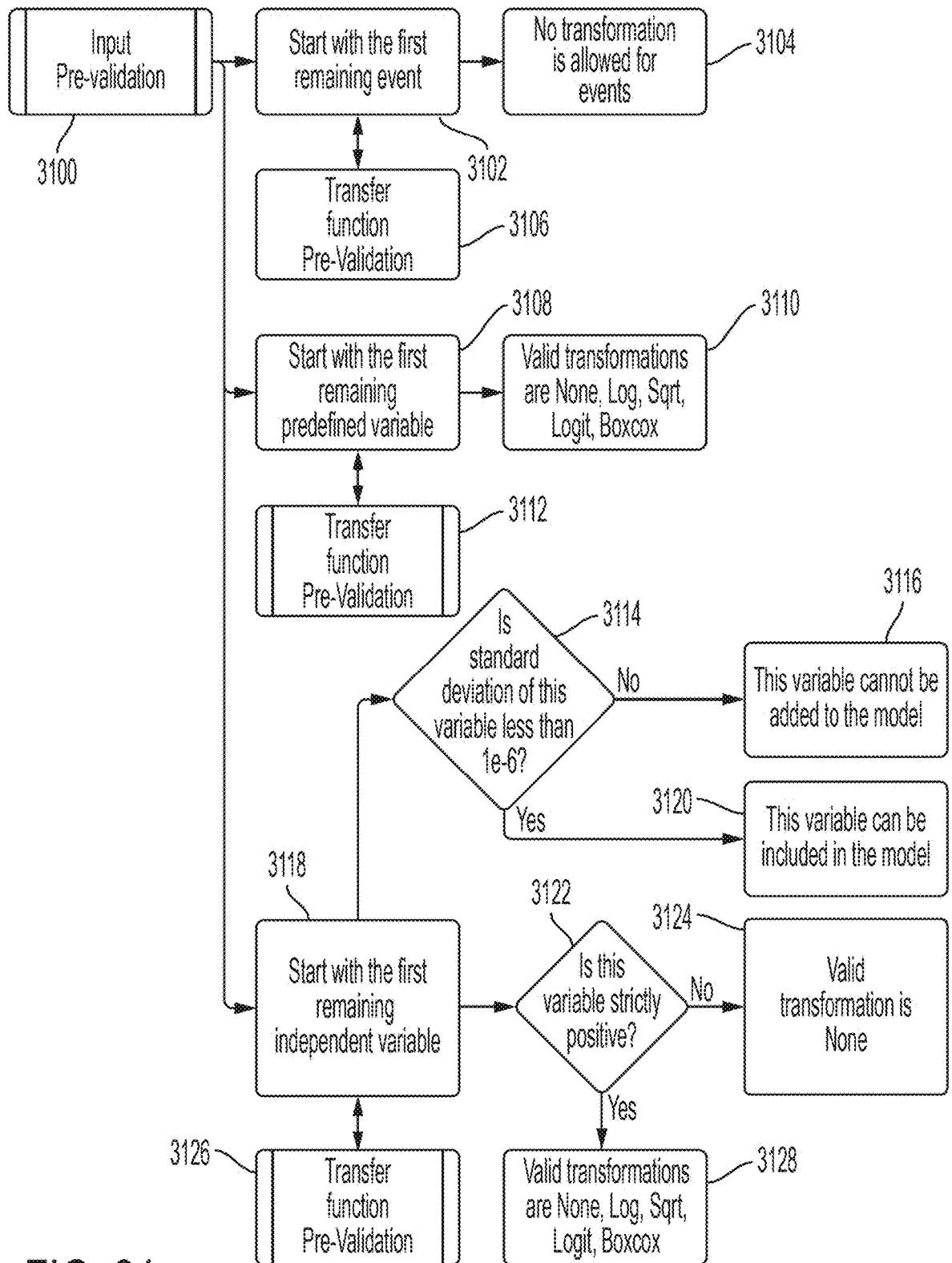
FIG. 31 shows a flowchart of an example of a pre-validation process for inputs according to some aspects of the present disclosure.

FIG. 31 shows an example of a pre-validation process for various inputs (e.g., events, predefined variables, and independent variables) in ARIMA/Subset ARIMA model according to some aspects of the present disclosure. In this example, no transformation may be allowed for events. All transformations may be valid for predefined variables. Transformations may be feasible for an independent variable only when it is strictly positive. An independent variable may be added to the model when its standard deviation is not less than 1 e-6. The settings of transfer function associated with each input may be analyzed in a transfer function pre-validation process that is described in greater detail later on.

More specifically, in block 3102 the forecasting software can start with the first remaining event and continue to block 3104, where no transformation is allowed. In block 3106, the forecasting software can initiate the transfer function pre-validation process. In block 3108, the forecasting software can start with the first remaining predefined variable and continue to block 3110, where the forecasting software can set the valid transformations to none, log, squrt, logit, and boxcox. In block 3112, the forecasting software can initiate the transfer function pre-validation process.

In block 3118, the forecasting software can start with the first remaining independent variable and initiate the transfer function pre-validation process at block 3126. The forecasting software can also determine if the remaining independent variable is strictly positive at block 3122. If not, the forecasting software can determine that there is not valid transformation. Otherwise, the forecasting software can determine that the valid transformations are none, log, sqrt, logit, and boxcox.

Figure 32:
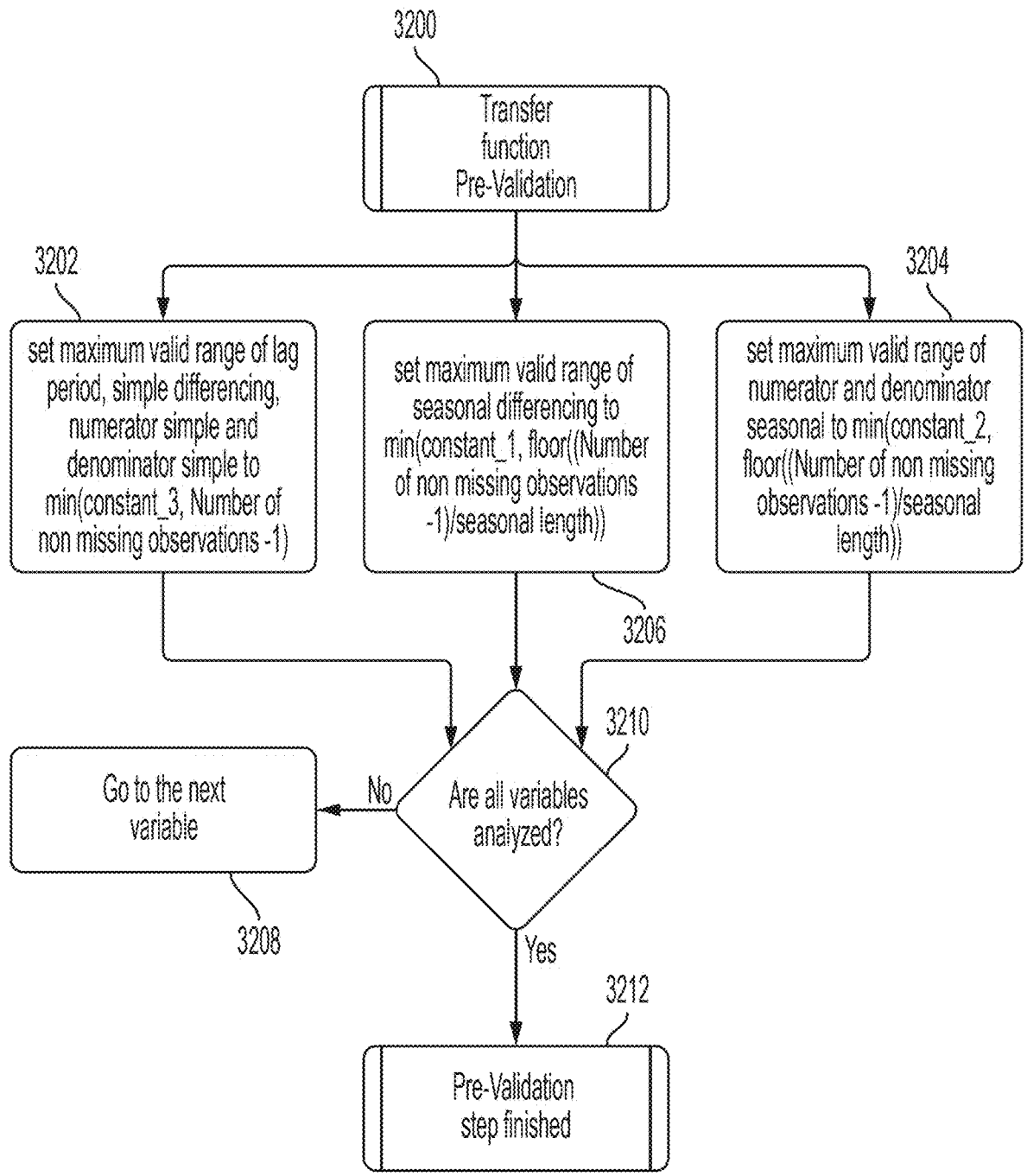
FIG. 32 shows a flowchart of an example of a transfer function pre-validation process according to some aspects of the present disclosure.

FIG. 32 shows an example of a transfer function pre-validation process according to some aspects of the present disclosure. The transfer function pre-validation process may be initiated at the points described above with respect to FIG. 31. The transfer function pre-validation process generally includes the pre-validation steps needed for input transfer functions in an ARIMA model and a subset ARIMA model. The transfer function pre-validation process may specify the maximum valid value for lag period, simple and seasonal differencing, numerator and denominator simple, and numerator and denominator seasonal.

In particular, the transfer function pre-validation process can involve setting the maximum valid range of lag period, simple differencing, numerator simple and denominator simple to a certain value at block 3202. The transfer function pre-validation process can also involve setting maximum valid range of seasonal differencing to a certain value at block 3204. The transfer function pre-validation process can further involve setting a maximum valid range of numerator seasonal and denominator seasonal to a certain value at block 3206. At block 3210, the forecasting software can determine if all variables are analyzed and, if not, the forecasting software can go to the next variable at block 3208 and the process can repeat. Otherwise, the transfer function pre-validation process can end at block 3212.

Figure 33A:
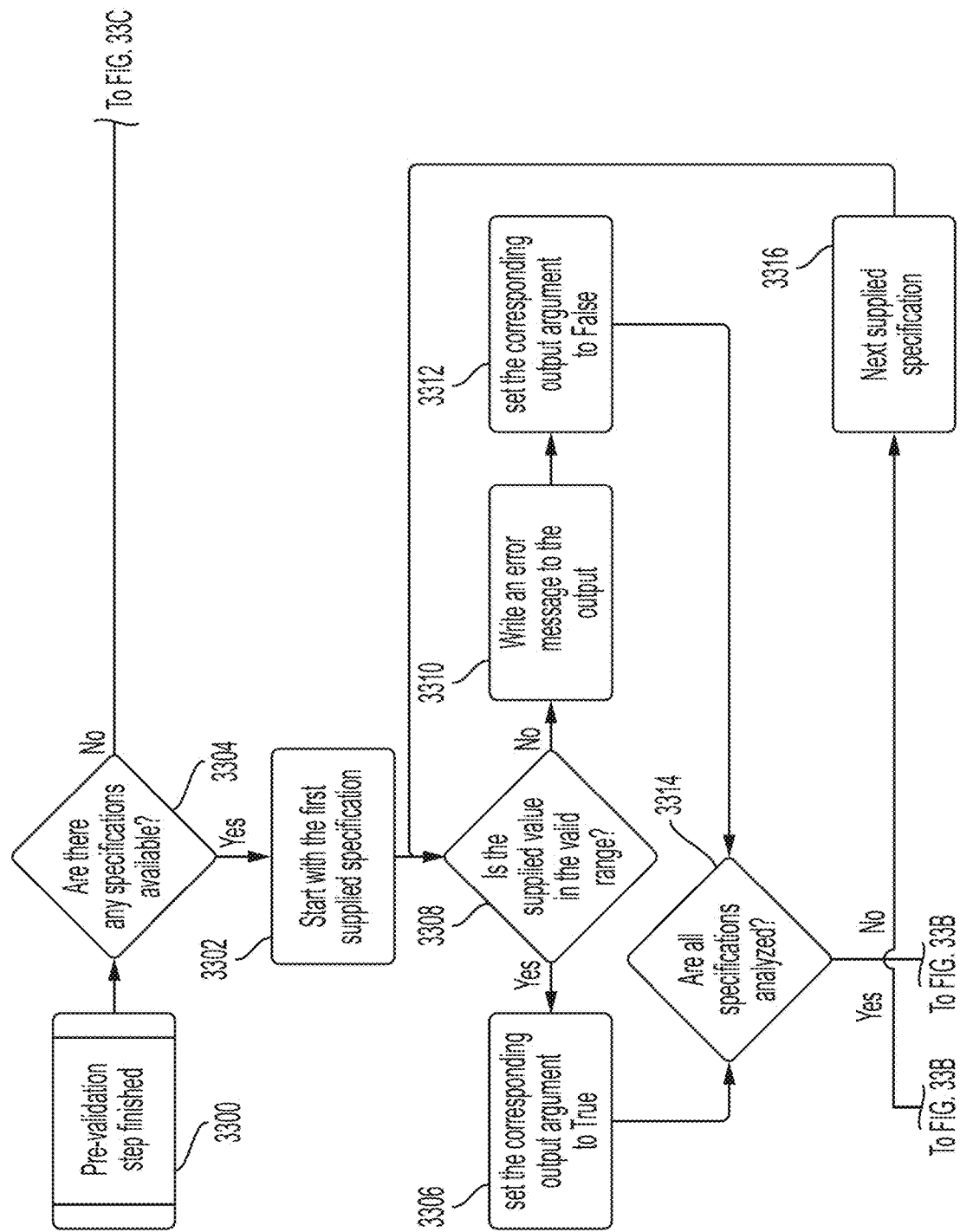
FIG. 33A-C show flowcharts of examples of post-validation processes according to some aspects of the present disclosure.
Figure 33B:
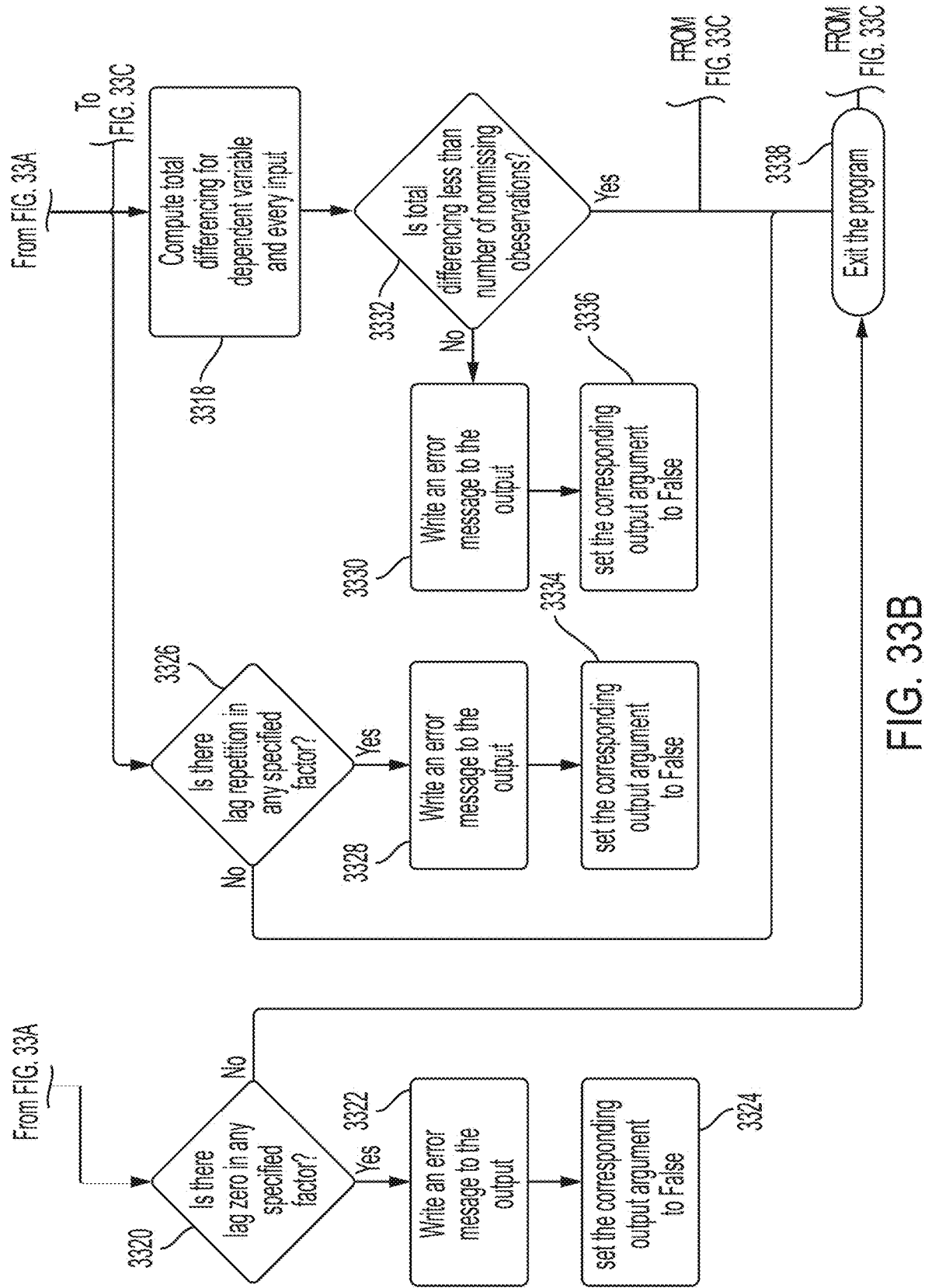
Figure 33C:
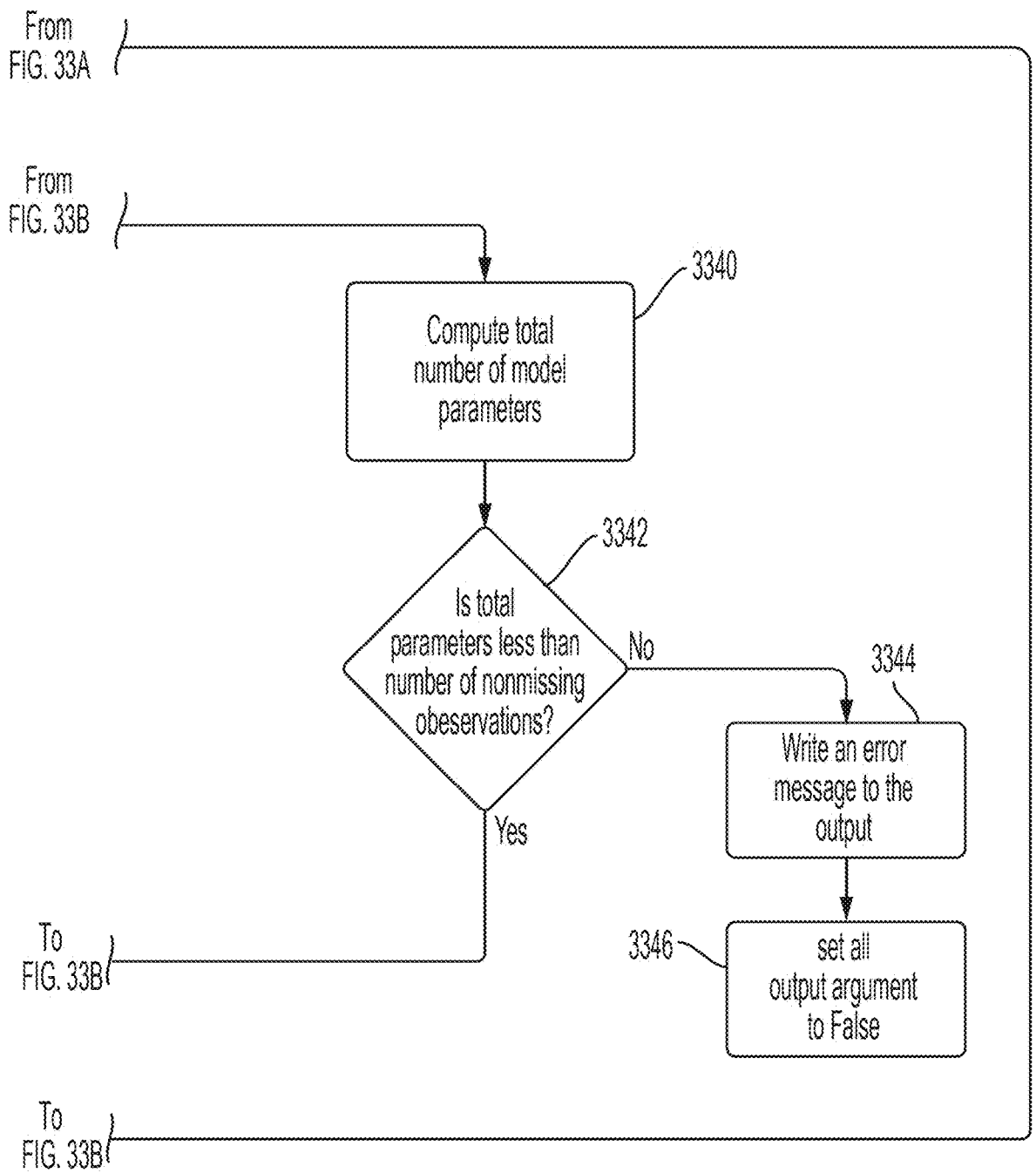

FIGS. 33A-C show flowcharts of an example of a post-validation process that can be performed after the pre-validation steps are finished for ARIMA and Subset ARIMA models according to some aspects of the present disclosure. The post-validation generally specifies whether the supplied specification is feasible or not based on the valid ranges indicated in pre-validation step and writes error messages to the output when needed. The post-validation process can provide additional conditions, such as checking if there is zero or repeated lags in any factor, if total parameters of the model is less than number of non-missing observations, or if total differencing is less than number of non-missing observations.

More specifically, referring now to FIG. 33A, the post-validation process can begin with the forecasting software determining whether there are any specifications available at block 3304. If not, the post-validation process can exit at block 3338 of FIG. 33B. Otherwise, the post-validation process can continue to block 3302, where the first supplied specification can be selected. At block 3308, the forecasting software determines whether the supplied value is in the valid range. If so, the forecasting software can set the corresponding output argument to "true" at block 3306. If not, the forecasting software can write an error message to the output at block 3310 and set the corresponding output argument to "false" at block 3312. At block 3312, the forecasting software determines whether all specifications have been analyzed. If not, the post-validation process can proceed to block 3316, where the next supplied specification can be selected and the process can repeat. If all specifications have been analyzed, the process can branch into two directions shown in FIG. 33B.

Referring now to FIG. 33B, the post-validation process can proceed in a first direction to block 3320, where the forecasting software can determine whether there is lag zero in any specified factor. If not, the process can exit at block 3338. Otherwise, the post-validation process can proceed to block 3322, where the forecasting software can write an error message to the output. At block 3324, the forecasting software can set the corresponding output argument to "false."

The post-validation process can also proceed in a second direction to block 3326 and block 3318. In block 3326, the forecasting software can determine if there is lag repetition in any specified factor. If so, the forecasting software can write an error message to the output at block 3328, and set the corresponding output argument to "false" at block 3334. If not, the post-validation process can exit at block 3338.

At block 3318, the forecasting software can compute the total differencing for the dependent variable and every input. The post-validation process can then proceed to block 3332, where the forecasting software can determine if the total differencing is less than the number of available observations. If so, the process can exit at block 3338. If not, the forecasting software can write an error message to the output at block 3330, and set the corresponding output argument to "false" at block 3336.

The post-validation process may also proceed in a third direction to FIG. 33C. As shown in FIG. 33C, the forecasting software can compute a total number of model parameters at block 3340. At block 3342, the forecasting software can then determine whether the total number of model parameters is less than the number of available observations. If not, the forecasting software can write an error message to the output at block 3344, and set all arguments to "false" at block 3346. Otherwise, the post-validation process may return to block 3338 of FIG. 33B and exit.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more memory devices including program code that is executable by the one or more processors for causing the one or more processors to:
receive a first selection, from a user, of time series data to be used in a forecasting project;
receive a second selection, from the user, of a type of forecasting model that is to be applied to the time series data in the forecasting project from among a plurality of types of forecasting models;
based on receiving the first selection and the second selection:
obtain a first set of candidate values for a first parameter of the selected type of forecasting model, the first set of candidate values being determined based on statistical information derived from the time series data;
obtain a second set of candidate values for a second parameter of the selected type of forecasting model, the second set of candidate values being determined based on the statistical information; and
provide the first set of candidate values and the second set of candidate values for output to the user;
receive selections, from the user, of a first parameter value from among the first set of candidate values and a second parameter value from among the second set of candidate values;
subsequent to receiving the selections and prior to generating the selected type of forecasting model, determine that a conflict exists between the first parameter value and the second parameter value, the conflict corresponding to an operational problem with the selected type of forecasting model, the conflict being determined by applying a set of conflict rules to the first parameter value and the second parameter value; and
based on determining that the conflict exists, generate an output indicating that the conflict exists between the first parameter value and the second parameter value.

2. The system of claim 1, wherein the one or more memory devices further include program code that is executable by the one or more processors for causing the one or more processors to:
receive the first selection of the time series data from a client device of the user via an application programming interface;
receive the second selection of the type of forecasting model from the client device via the application programming interface;
provide the first set of candidate values and the second set of candidate values for output to the user by transmitting the first set of candidate values and the second set of candidate values to the client device via the application programming interface;
receive the selections of the first parameter value and the second parameter value from the client device via the application programming interface; and
transmit a conflict notification indicating that the conflict exists to the client device via the application programming interface.

3. The system of claim 2, wherein the one or more processors are part of a backend system associated with forecasting software, and wherein the client device is configured to:

receive the conflict notification; and based on receiving the conflict notification, prevent the forecasting software from generating the selected type of forecasting model at least until the conflict is resolved.

4. The system of claim 3, wherein the one or more memory devices further include program code that is executable by the one or more processors for causing the one or more processors to:

receive, from the client device via the application programming interface, one or more adjusted values for the selections that resolve the conflict; and based on the conflict being resolved, transmit an approval notification to the client device via the application programming interface, the client device being configured to allow the forecasting software to generate the selected type of forecasting model in response to receiving the approval notification.

5. The system of claim 1, wherein the output is an error message, and wherein the one or more memory devices further include program code that is executable by the one or more processors for causing the one or more processors to:

receive the first selection of the time series data from the user via a graphical user interface;

receive the second selection of the type of forecasting model via the graphical user interface;

provide the first set of candidate values and the second set of candidate values for output to the user in the graphical user interface, wherein the graphical user interface is configured to include graphical input elements through which the user can select one of the first set of candidate values for the first parameter and one of the second set of candidate values for the second parameter;

receive the selections of the first parameter value and the second parameter value via the graphical user interface; and output the error message to the user in the graphical user interface.

6. The system of claim 5, wherein the graphical input elements include a first menu listing the first set of candidate values and a second menu listing the second set of candidate values.

7. The system of claim 1, wherein the program code is further executable by the one or more processors for causing the one or more processors to:

select the first parameter and the second parameter from among a plurality of model parameters based on the selected type of forecasting model; and determine the first set of candidate values and the second set of candidate values by applying a set of rules to the statistical information.

8. The system of claim 1, wherein the program code is further executable by the one or more processors for causing the one or more processors to:

generate the statistical information by analyzing the time series data, wherein the statistical information includes a mean of the time series data, a standard deviation associated with the time series data, a maximum value of the time series data, a minimum value of the time series data, and a number of observations in the time series data.

9. The system of claim 1, wherein the program code is further executable by the one or more processors for causing the one or more processors to:

receive a value for a parameter of the selected type of forecasting model;

in response to receiving the value for the parameter, validate the value for the parameter based on a predefined set of rules; and in response to determining that the value for the parameter is invalid, generate another output indicating that the value for the parameter is invalid.

10. The system of claim 1, wherein the program code is further executable by the one or more processors for causing the one or more processors to:

modify the second set of candidate values based on the first parameter value selected by the user, to thereby produce a modified set of candidate values for the second parameter; and provide the modified set of candidate values for output to the user.

11. The system of claim 1, wherein the program code is further executable by the one or more processors for causing the one or more processors to:

select the plurality of types of forecasting models, from among a group of forecasting model types, based on the statistical information derived from the time series data.

12. The system of claim 1, wherein the program code corresponds to a web application executable in a website browser.

13. A method comprising:

receiving, by one or more processors and from a user, a first selection of time series data to be used in a forecasting project;

receiving, by the one or more processors and from the user, a second selection of a type of forecasting model that is to be applied to the time series data in the forecasting project from among a plurality of types of forecasting models;

based on receiving the first selection and the second selection:

obtaining, by the one or more processors, a first set of candidate values for a first parameter of the selected type of forecasting model, the first set of candidate values being determined based on statistical information derived from the time series data;

obtaining, by the one or more processors, a second set of candidate values for a second parameter of the selected type of forecasting model, the second set of candidate values being determined based on the statistical information; and providing, by the one or more processors, the first set of candidate values and the second set of candidate values for output to the user;

receiving, by the one or more processors and from the user, selections of a first parameter value from among the first set of candidate values and a second parameter value from among the second set of candidate values;

subsequent to receiving the selections and prior to generating the selected type of forecasting model, determining, by the one or more processors, that a conflict exists between the first parameter value and the second parameter value, the conflict corresponding to an operational problem with the selected type of forecasting model, the conflict being determined by applying a set of conflict rules to the first parameter value and the second parameter value; and based on determining that the conflict exists, generating, by the one or more processors, an output indicating that the conflict exists between the first parameter value and the second parameter value.

14. The method of claim 13, further comprising:
receiving the first selection of the time series data from a client device of the user via an application programming interface;
receiving the second selection of the type of forecasting model from the client device via the application programming interface;
providing the first set of candidate values and the second set of candidate values for output to the user by transmitting the first set of candidate values and the second set of candidate values to the client device via the application programming interface;
receiving the selections of the first parameter value and the second parameter value from the client device via the application programming interface; and
transmitting a conflict notification indicating that the conflict exists to the client device via the application programming interface.

15. The method of claim 14, wherein the one or more processors are part of a backend system associated with forecasting software, and wherein the client device is configured to:
receive the conflict notification; and
based on receiving the conflict notification, prevent the forecasting software from generating the selected type of forecasting model at least until the conflict is resolved.

16. The method of claim 15, further comprising:
receiving, from the client device via the application programming interface, one or more adjusted values for the selections that resolve the conflict; and
based on the conflict being resolved, transmitting an approval notification to the client device via the application programming interface, the client device being configured to allow the forecasting software to generate the selected type of forecasting model in response to receiving the approval notification.

17. The method of claim 13, wherein the output is an error message, and further comprising:
receiving the first selection of the time series data from the user via a graphical user interface;
receiving the second selection of the type of forecasting model via the graphical user interface;
providing the first set of candidate values and the second set of candidate values for output to the user in the graphical user interface, wherein the graphical user interface is configured to include graphical input elements through which the user can select one of the first set of candidate values for the first parameter and one of the second set of candidate values for the second parameter;
receiving the selections of the first parameter value and the second parameter value via the graphical user interface; and
outputting the error message to the user in the graphical user interface.

18. The method of claim 17, wherein the graphical input elements include a first menu listing the first set of candidate values and a second menu listing the second set of candidate values.

19. The method of claim 13, further comprising:
selecting the first parameter and the second parameter from among a plurality of model parameters based on the selected type of forecasting model; and
determining the first set of candidate values and the second set of candidate values by applying a set of rules to the statistical information.

20. The method of claim 13, further comprising:
generating the statistical information by analyzing the time series data, wherein the statistical information includes a mean of the time series data, a standard deviation associated with the time series data, a maximum value of the time series data, a minimum value of the time series data, and a number of observations in the time series data.

21. The method of claim 13, further comprising:
receiving, from the user, a value for a parameter of the selected type of forecasting model;
in response to receiving the value for the parameter, validating the value for the parameter based on a predefined set of rules; and
in response to determining that the value for the parameter is invalid, generating another output indicating that the value for the parameter is invalid.

22. The method of claim 13, further comprising:
modifying the second set of candidate values based on the first parameter value selected by the user, to thereby produce a modified set of candidate values for the second parameter; and
providing the modified set of candidate values for output to the user.

23. The method of claim 13, further comprising:
selecting the plurality of types of forecasting models, from among a group of forecasting model types, based on the statistical information derived from the time series data.

24. A non-transitory computer-readable medium comprising program code that is executable by one or more processors for causing the one or more processors to:
receive a first selection, from a user, of time series data to be used in a forecasting project;
receive a second selection, from the user, of a type of forecasting model that is to be applied to the time series data in the forecasting project from among a plurality of types of forecasting models;
based on receiving the first selection and the second selection:
obtain a first set of candidate values for a first parameter of the selected type of forecasting model, the first set of candidate values being determined based on statistical information derived from the time series data;
obtain a second set of candidate values for a second parameter of the selected type of forecasting model, the second set of candidate values being determined based on the statistical information; and
provide the first set of candidate values and the second set of candidate values for output to the user;
receive selections, from the user, of a first parameter value from among the first set of candidate values and a second parameter value from among the second set of candidate values;
subsequent to receiving the selections and prior to generating the selected type of forecasting model, determine that a conflict exists between the first parameter value and the second parameter value, the conflict corresponding to an operational problem with the selected type of forecasting model, the conflict being determined by applying a set of conflict rules to the first parameter value and the second parameter value; and based on determining that the conflict exists, generate an output indicating that the conflict exists between the first parameter value and the second parameter value.

25. The non-transitory computer-readable medium of claim 24, further comprising program code that is executable by the one or more processors for causing the one or more processors to:
receive the first selection of the time series data from a client device of the user via an application programming interface;
receive the second selection of the type of forecasting model from the client device via the application programming interface;
provide the first set of candidate values and the second set of candidate values for output to the user by transmitting the first set of candidate values and the second set of candidate values to the client device via the application programming interface;
receive the selections of the first parameter value and the second parameter value from the client device via the application programming interface; and
transmit a conflict notification indicating that the conflict exists to the client device via the application programming interface.

26. The non-transitory computer-readable medium of claim 25, wherein the one or more processors are part of a backend system associated with forecasting software, and wherein the client device is configured to:
receive the conflict notification; and
based on receiving the conflict notification, prevent the forecasting software from generating the selected type of forecasting model at least until the conflict is resolved.

27. The non-transitory computer-readable medium of claim 26, further comprising program code that is executable by the one or more processors for causing the one or more processors to:
receive, from the client device via the application programming interface, one or more adjusted values for the selections that resolve the conflict; and
based on the conflict being resolved, transmit an approval notification to the client device via the application programming interface, the client device being configured to allow the forecasting software to generate the selected type of forecasting model in response to receiving the approval notification.

28. The non-transitory computer-readable medium of claim 24, wherein the output is an error message, and further comprising program code that is executable by the one or more processors for causing the one or more processors to:
receive the first selection of the time series data from the user via a graphical user interface;
receive the second selection of the type of forecasting model via the graphical user interface;
provide the first set of candidate values and the second set of candidate values for output to the user in the graphical user interface, wherein the graphical user interface is configured to include graphical input elements through which the user can select one of the first set of candidate values for the first parameter and one of the second set of candidate values for the second parameter;
receive the selections of the first parameter value and the second parameter value via the graphical user interface; and
output the error message to the user in the graphical user interface.

29. The non-transitory computer-readable medium of claim 24, further comprising program code that is executable by the one or more processors for causing the one or more processors to:
select the first parameter and the second parameter from among a plurality of model parameters based on the selected type of forecasting model; and
determine the first set of candidate values and the second set of candidate values by applying a set of rules to the statistical information.

30. The non-transitory computer-readable medium of claim 24, further comprising program code that is executable by the one or more processors for causing the one or more processors to:
generate the statistical information by analyzing the time series data, wherein the statistical information includes a mean of the time series data, a standard deviation associated with the time series data, a maximum value of the time series data, a minimum value of the time series data, and a number of observations in the time series data.

* * * * *